US008822743B2

(12) United States Patent
Layman, Jr. et al.

(10) Patent No.: US 8,822,743 B2
(45) Date of Patent: Sep. 2, 2014

(54) ADDUCTS, ADDUCTS AND OLIGOMERS, OR ADDUCTS, OLIGOMERS AND LOW MOLECULAR WEIGHT POLYMERS, AND THEIR PREPARATION

(71) Applicant: Albemarle Corporation, Baton Rouge, LA (US)

(72) Inventors: William J. Layman, Jr., Baton Rouge, LA (US); Arthur G. Mack, Prairieville, LA (US); Charles H. Kolich, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 13/833,319

(22) Filed: Mar. 15, 2013

(65) Prior Publication Data

US 2013/0210995 A1     Aug. 15, 2013

Related U.S. Application Data

(62) Division of application No. 12/602,648, filed as application No. PCT/US2008/066219 on Jun. 6, 2008, now Pat. No. 8,420,876.

(60) Provisional application No. 60/942,599, filed on Jun. 7, 2007.

(51) Int. Cl.
*C07C 15/00*     (2006.01)
*C07C 15/16*     (2006.01)

(52) U.S. Cl.
USPC .................. 585/24; 585/25; 585/26

(58) Field of Classification Search
USPC ............................... 585/24, 25, 26
See application file for complete search history.

(56) References Cited

U.S. PATENT DOCUMENTS

| | | | |
|---|---|---|---|
| 2,243,543 A | 5/1941 | Horst |
| 2,757,146 A | 7/1956 | Fawcett |
| 2,914,489 A | 11/1959 | Hall |
| 2,954,412 A | 9/1960 | Wulf et al. |
| 3,221,068 A | 11/1965 | Gorham |
| 3,356,754 A | 12/1967 | Wofford |
| 3,372,880 A | 3/1968 | O'Hara |
| 3,373,135 A | 3/1968 | Jenkner et al. |
| 3,451,988 A | 6/1969 | Langer, Jr. |
| 3,458,586 A | 7/1969 | Langer, Jr. |
| 3,536,679 A | 10/1970 | Langer, Jr. |
| 3,541,149 A | 11/1970 | Langer, Jr. |

(Continued)

FOREIGN PATENT DOCUMENTS

| CA | 919343 | 1/1973 |
|---|---|---|
| CN | 1865294 A1 | 11/2006 |

(Continued)

OTHER PUBLICATIONS

Concise, Polymeric Materials Encyclopedia, Editor-in-Chief, Joseph C. Salamone, CRC Press, 1999, pp. 1305-1307.

(Continued)

*Primary Examiner* — Ellen McAvoy
(74) *Attorney, Agent, or Firm* — James A. Jubinsky

(57) ABSTRACT

This invention provides adducts, mixtures of adducts and oligomers, and/or mixtures of adducts, oligomers, and low molecular weight polymers formed from monovinylaromatic hydrocarbons.

11 Claims, 1 Drawing Sheet

(56) References Cited

U.S. PATENT DOCUMENTS

| | | | |
|---|---|---|---|
| 3,594,396 A | 7/1971 | Langer, Jr. | |
| 3,634,548 A | 1/1972 | Harwell et al. | |
| 3,668,263 A | 6/1972 | Morrison et al. | |
| 3,725,368 A | 4/1973 | Morrison et al. | |
| 3,742,077 A | 6/1973 | Kamienski et al. | |
| 3,751,384 A | 8/1973 | Langer, Jr. | |
| 3,751,501 A | 8/1973 | Kamienski et al. | |
| 3,760,025 A | 9/1973 | Merkley | |
| 3,850,882 A | 11/1974 | Underwood et al. | |
| 3,943,195 A | 3/1976 | Naarmann et al. | |
| 4,041,088 A | 8/1977 | Bach et al. | |
| 4,049,732 A | 9/1977 | Bach et al. | |
| 4,074,032 A | 2/1978 | Naarmann et al. | |
| 4,078,019 A | 3/1978 | Langer, Jr. | |
| 4,107,231 A | 8/1978 | Wurmb et al. | |
| 4,108,921 A | 8/1978 | Langer, Jr. | |
| 4,129,551 A | 12/1978 | Rueter et al. | |
| 4,129,705 A | 12/1978 | de Zarauz | |
| 4,134,938 A | 1/1979 | Langer, Jr. | |
| 4,137,212 A | 1/1979 | Theysohn et al. | |
| 4,143,221 A | 3/1979 | Naarmann et al. | |
| 4,151,223 A | 4/1979 | Neuberg et al. | |
| 4,200,702 A | 4/1980 | Gausepohl et al. | |
| 4,268,705 A | 5/1981 | Palmer | |
| 4,311,818 A | 1/1982 | Sigwalt et al. | |
| 4,360,455 A | 11/1982 | Lindenschmidt et al. | |
| 4,435,312 A | 3/1984 | Lecolier et al. | |
| 4,450,259 A | 5/1984 | Roggero et al. | |
| 4,463,135 A | 7/1984 | Maly | |
| 4,482,677 A | 11/1984 | Teranaka et al. | |
| 4,535,135 A | 8/1985 | Lecolier et al. | |
| 4,636,540 A | 1/1987 | Warfel | |
| 4,701,498 A | 10/1987 | Roggero et al. | |
| 4,734,461 A | 3/1988 | Roggero et al. | |
| 4,753,745 A * | 6/1988 | Kostusyk et al. | 508/588 |
| 4,755,573 A | 7/1988 | Aycock | |
| 4,829,135 A | 5/1989 | Gunesin et al. | |
| 4,853,440 A | 8/1989 | Roggero et al. | |
| 4,880,553 A * | 11/1989 | Kostusyk et al. | 508/588 |
| 4,883,846 A | 11/1989 | Moore et al. | |
| 4,885,419 A * | 12/1989 | Shimizu et al. | 585/25 |
| 4,950,721 A | 8/1990 | Dias et al. | |
| 4,957,815 A * | 9/1990 | Commandeur et al. | 428/402.2 |
| 4,975,496 A | 12/1990 | Tigner et al. | |
| 5,112,897 A | 5/1992 | Dever et al. | |
| 5,112,898 A | 5/1992 | Dever et al. | |
| 5,196,622 A | 3/1993 | Pettijohn et al. | |
| 5,198,594 A | 3/1993 | Lillwitz et al. | |
| 5,302,768 A | 4/1994 | Hussain | |
| 5,310,858 A | 5/1994 | Greiner et al. | |
| 5,326,836 A | 7/1994 | Hwang et al. | |
| 5,457,248 A | 10/1995 | Mack et al. | |
| 5,625,017 A | 4/1997 | Morita et al. | |
| 5,637,650 A | 6/1997 | Gill et al. | |
| 5,654,384 A | 8/1997 | Halasa et al. | |
| 5,677,390 A | 10/1997 | Dadgar et al. | |
| 5,686,538 A | 11/1997 | Balhoff et al. | |
| 5,687,090 A | 11/1997 | Chen et al. | |
| 5,728,782 A | 3/1998 | Brady et al. | |
| 5,741,949 A | 4/1998 | Mack | |
| 5,767,203 A | 6/1998 | Ao et al. | |
| 5,852,131 A | 12/1998 | Balhoff et al. | |
| 5,852,132 A | 12/1998 | Dadgar et al. | |
| 5,902,865 A | 5/1999 | Gausepohl et al. | |
| 5,916,978 A | 6/1999 | Ao et al. | |
| 6,008,283 A | 12/1999 | Rose et al. | |
| 6,025,450 A | 2/2000 | Lawson et al. | |
| 6,071,864 A * | 6/2000 | Hsi Ho et al. | 508/591 |
| 6,093,211 A | 7/2000 | Hamielec et al. | |
| 6,133,381 A | 10/2000 | Reed et al. | |
| 6,174,457 B1 * | 1/2001 | Kato et al. | 252/299.63 |
| 6,207,765 B1 | 3/2001 | Ao et al. | |
| 6,232,393 B1 | 5/2001 | Dadgar et al. | |
| 6,232,408 B1 | 5/2001 | Dadgar et al. | |
| 6,235,831 B1 | 5/2001 | Reed et al. | |
| 6,235,844 B1 | 5/2001 | Dadgar et al. | |
| 6,313,230 B1 | 11/2001 | Tsai et al. | |
| 6,326,439 B1 | 12/2001 | Dadgar et al. | |
| 6,348,166 B1 | 2/2002 | Knoll et al. | |
| 6,355,194 B1 | 3/2002 | Agur et al. | |
| 6,362,293 B1 | 3/2002 | Newman et al. | |
| 6,521,714 B2 | 2/2003 | Kolich et al. | |
| 6,657,028 B1 | 12/2003 | Aplin et al. | |
| 6,759,498 B2 | 7/2004 | Ikematsu et al. | |
| 6,767,960 B2 | 7/2004 | Bae et al. | |
| 6,933,343 B2 | 8/2005 | Ikematsu et al. | |
| 7,288,612 B2 | 10/2007 | Desbois et al. | |
| 7,351,777 B2 | 4/2008 | Moore et al. | |
| 7,425,290 B2 | 9/2008 | Semen | |
| 7,632,893 B2 | 12/2009 | Kolich et al. | |
| 2002/0035214 A1 | 3/2002 | Gill et al. | |
| 2002/0183465 A1 | 12/2002 | Babcock et al. | |
| 2005/0143526 A1 | 6/2005 | Faust et al. | |
| 2005/0209408 A1 | 9/2005 | Lee et al. | |
| 2006/0079644 A1 | 4/2006 | Meyer et al. | |
| 2007/0004870 A1 | 1/2007 | Kolich et al. | |
| 2007/0142566 A1 | 6/2007 | Kolich et al. | |
| 2007/0185280 A1 | 8/2007 | Luther | |
| 2007/0232759 A1 | 10/2007 | Chun et al. | |
| 2010/0184941 A1 | 7/2010 | Layman, Jr. et al. | |

FOREIGN PATENT DOCUMENTS

| | | |
|---|---|---|
| CN | 100369941 C | 2/2008 |
| DE | 1570376 | 7/1969 |
| DE | 1589700 | 7/1970 |
| DE | 2050009 A1 | 5/1971 |
| DE | 2758781 A1 | 7/1979 |
| DE | 19516563 A1 | 11/1996 |
| EP | 0000141 A1 | 1/1979 |
| EP | 0 002 514 B1 | 6/1979 |
| EP | 0 277 429 B1 | 8/1988 |
| EP | 0334715 B1 | 5/1993 |
| EP | 0741147 A1 | 11/1996 |
| EP | 0775719 A2 | 5/1997 |
| EP | 0806437 A1 | 11/1997 |
| GB | 1107898 A1 | 3/1968 |
| GB | 1174845 A1 | 12/1969 |
| GB | 1270318 A1 | 4/1972 |
| GB | 1342101 A1 | 12/1973 |
| GB | 1536762 | 12/1978 |
| GB | 1589700 | 5/1981 |
| GB | 2164051 A1 | 3/1986 |
| JP | 59-155454 | 9/1984 |
| JP | 62-042938 | 2/1987 |
| JP | 08-188622 | 7/1996 |
| JP | 09-249705 A1 | 9/1997 |
| JP | 09-249706 A1 | 9/1997 |
| JP | 10-182730 A1 | 7/1998 |
| JP | 11-43511 A1 | 2/1999 |
| JP | 11-080220 A1 | 3/1999 |
| JP | 11-116613 A1 | 4/1999 |
| JP | 2001-341246 A1 | 12/2001 |
| WO | 90/15095 A1 | 12/1990 |
| WO | 99/25746 A1 | 5/1999 |
| WO | 99/55770 A1 | 11/1999 |
| WO | 00/15678 A1 | 3/2000 |
| WO | 02/072645 A2 | 9/2002 |
| WO | 03/020826 A1 | 3/2003 |
| WO | 2005/118245 A1 | 12/2005 |
| WO | 2007/005233 A1 | 1/2007 |
| WO | 2007/076369 A1 | 7/2007 |
| WO | 2008/011477 A2 | 1/2008 |
| WO | 2008/066970 A1 | 6/2008 |
| WO | 2008/154453 A1 | 12/2008 |
| WO | 2008/154454 A2 | 12/2008 |
| WO | 2009/148464 A1 | 12/2009 |
| WO | 2010/065462 A2 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |

(56) References Cited

FOREIGN PATENT DOCUMENTS

WO     2010/127087 A1    11/2010
WO     2010/127091 A1    11/2010

OTHER PUBLICATIONS

DIC Corporation, Epoxy Resins, Brominated Flame Retardant Pratherm, from website http://www.dic.co.jp/en/products/epoxy/pratherm.html, 1 page.
ICL Industrial Products, F-3014-End Capped Brominated Epoxy, from website http://www.icl-ip.com/Brome/Brome.nsf/viewGetMain/Product350-40/$file/F-3014.pdf, 1 page.
Milner, R., et al., "Anionic telomerization of butadiene with toluene and diphenylmethane: microstructure and molecular weight", Polymer, vol. 26, 1985, pp. 1265-1267.
Advanced Organic Chemistry, Reactions, Mechanisms, and Structure, 4th Ed., Jerry March, J. Wiley & Sons, 1992, pp. 743-744.
Atkins, P. W., Physical Chemistry, 4th Ed., W. H. Freeman and Co., 1990, p. 800.
Baskaran, D., et al., "Effect of Chelation of the Lithium Cation on the Anionic Polymerization of Methyl Methacrylate Using Organolithium Initiators", Macromolecules, 1995, 28, pp. 7315-7317.
Bildmann, U. J., et al., "Synthesis and Structure of the Tmeda Adduct of a Dibenzyl Lithiate Anion Containing Four-Coordinate Lithium", Organometallics, 2001, 20, pp. 1689-1691.
CAPLUS Abstract of Chakrapani, S., et al., "Strategies for the controlled, living anionic polymerization of acrylic and methacrylic monomers and novel star polymers", Polymer Science, 1994, vol. 1, pp. 112-117. 1 page.
Eberhardt, G. G., et al., "A Catalytic Telomerization Reaction of Ethylene with Aromatic Hydrocarbons", J. Org. Chem., vol. 29, 1964, pp. 2928-2932.
Eberhardt, G. G., et al., "Telomerization Reactions Involving a N-Chelated Organo Lithium Catalyst", Polymer Preprints, 1972, vol. 13, pp. 667-671.
Feil, F., et al., "Benzyl Complexes of the Heavier Alkaline-Earth Metals: The First Crystal Structure of a Dibenzylstrontium Complex", Organometallics, 2001, vol. 20, pp. 4616-4622.
Caplus Abstract of Fujimoto, T., et al., "Preparation of monodisperse polystyrenes with high molecular weights", Polymer Journal, 1975, 7(3), pp. 397-401. 1 page.
Gatzke, A.L., "Chain Transfer in Anionic Polymerization. Determination of Chain-Transfer Constants by Using Carbon-14-Labeled Chain Transfer Agents", Journal of Polymer Science, Part A-1, 1969, vol. 7, pp. 2281-2292.
Science Direct Abstract of Helary, G., et al., "Etude de la polymerisation anionique du styrene en milieu non polaire, en presence de N,N,N',N' tetramethyl ethylene diamine", European Polymer Journal, 1978, vol. 14, issue 5, pp. 345-348. 1 page.
Hennion, G. F., et al., "The Polybromination of Alkylbenzenes", J. Am. Chem. Soc., 1946, vol. 68, issue 3, pp. 424-426.
CAPLUS Abstract of Ito, M., et al., "Synthesis of well-defined block copolymers containing poly(N-isopropylacrylamide) segment by anionic block copolymerization of N-methoxymethyl-N-isopropylacrylamide", Designed Monomers and Polymers, 2004, 7(1-2), pp. 11-24. 1 page.
Junkui, C., "Synthesis of Narrow Distribution Polystyrene in RLi-Ligand Complex Systems", Chemical Journal of Chinese Universities, 1989, vol. 10, No. 12, pp. 1246-1250. Abstract only translated.

CAPLUS Abstract of Kalnins, K, et al., "Electronic structure of complexes of benzyl anion and ion pairs with styrene", Vysokimolekulyarnye Soedineniya, Seriya A (1990), 32(2), 316-21. 1 page.
Lamneck, Jr., J. H., "Bromination of the Two Propylbenzenes and Three Butylbenzenes", J. Am. Chem. Soc., 1954, vol. 76, issue 4, pp. 1106-1107.
CAPLUS Abstract of Langer, A. W., Jr., "Reactions of Chelated Organolithium Compounds", Transactions of the New York Academy of Sciences, 1965, 27(7), pp. 741-747. 1 page.
Marechal, Jean-Marc, et al., "Stereoregulation in the anionic polymerization of styrene initiated by superbases", Polymer, 2003, vol. 44, pp. 7601-7607.
Marechal, Jean-Marc, et al., "Stereospecific anionic polymerization of styrene initiated by R2Mg/ROMt 'ate' complexes", Polymer, 2004, 45, pp. 4641-4646.
Maruoka, K., et al., "Novel Anionic Oligomerization by a New, Sequential Generation of Organolithium Compounds", Macromolecules, 1996, 29, pp. 3328-3329.
Mizuno, T., et al., "Second and Third Virial Coefficients of Polystyrene with Benzyl Ends near the Theta Point", Macromolecules, 2005, 38, pp. 4432-4437.
CAPLUS Abstract of Morton, M., "Homogeneous anionic polymerization. II. Molecular weight of polystyrene initiated by lithium alkyls", Journal of Polymer Science, 1963, Part A-1, pp. 461-474. 1 page.
CAPLUS Abstract of Narita, T., et al., "Reactivity of butyllithium-MeOCH2CH2OLi System as catalyst for copolymerization of styrene with 1,3-butadiene", Journal of Macromolecular Science, Chemistry, 1970, 4(2), pp. 277-294. 1 page.
Patterman, S. P., et al., "Pi Complexation in Ion Pair Bonding. The Structure of Benzyllithium Triethylenediamine", J. Am. Chem. Soc., 1970, 92:5, pp. 1150-1157.
Pines, H., et al., "Sodium-catalyzed side chain aralkylation of alkylbenzenes with Styrene", J. Am. Chem. Soc, 1958, vol. 80(22), pp. 6001-6004.
Pines, H., et al., "Sodium Catalyzed Reactions. II. Side-chain Ethylation of Alkyl Aromatic Hydrocarbons Catalyzed by Sodium", J. Am. Chem. Soc., 1955, vol. 77(3), pp. 554-559.
Reed, J. N., "Product Subclass 13: Benzyllithium Compounds and (Lithiomethyl)Hetarenes", Science of Synthesis, 2006 (vol. date 2005), vol. 8A, pp. 329-355.
Seki, A., et al., "Crossed aldol reaction using cross-linked polymer-bound lithium dialkylamide", Tetrahedron, 2004, vol. 60, pp. 5001-5011.
Sorenson, W. R., et al., Preparative Methods of Polymer Chemistry, Interscience Publishers, Inc., 1961, pp. 198-200.
Strohmann, C., et al., "A Highly Diastereomerically Enriched Benzyllithium Compound: The Molecular Structure and the Stereochemical Course of Its Transformations", Organometallics, 2002, vol. 21, pp. 3079-3081.
Tsukahara, Y., et al., "Preparation and Characterization of alpha-benzyl-omega-vinylbenzyl Polystyrene Macromonomer", Polymer Journal, 1994, vol. 26, No. 9, pp. 1013-1018.
CAPLUS Abstract of Waack, R., et al., "Effects of lithium halides on the reactivity of organolithium compounds (in polymerization)", Chemistry & Industry, 1964, vol. 12, pp. 496-497. 1 page.
Waack, R., et al., "Reactivities of Organolithium Compounds in Tetrahydrofuran. I. As Vinyl Polymerization Initiators", J. Org. Chem., 1967, 32(11), pp. 3395-3399.
Wilhelm, D., et al., "Reactions of Polyanions Derived from Alkylbenzenes", J. Am. Chem. Soc., 1984, 106, pp. 361-367.

* cited by examiner

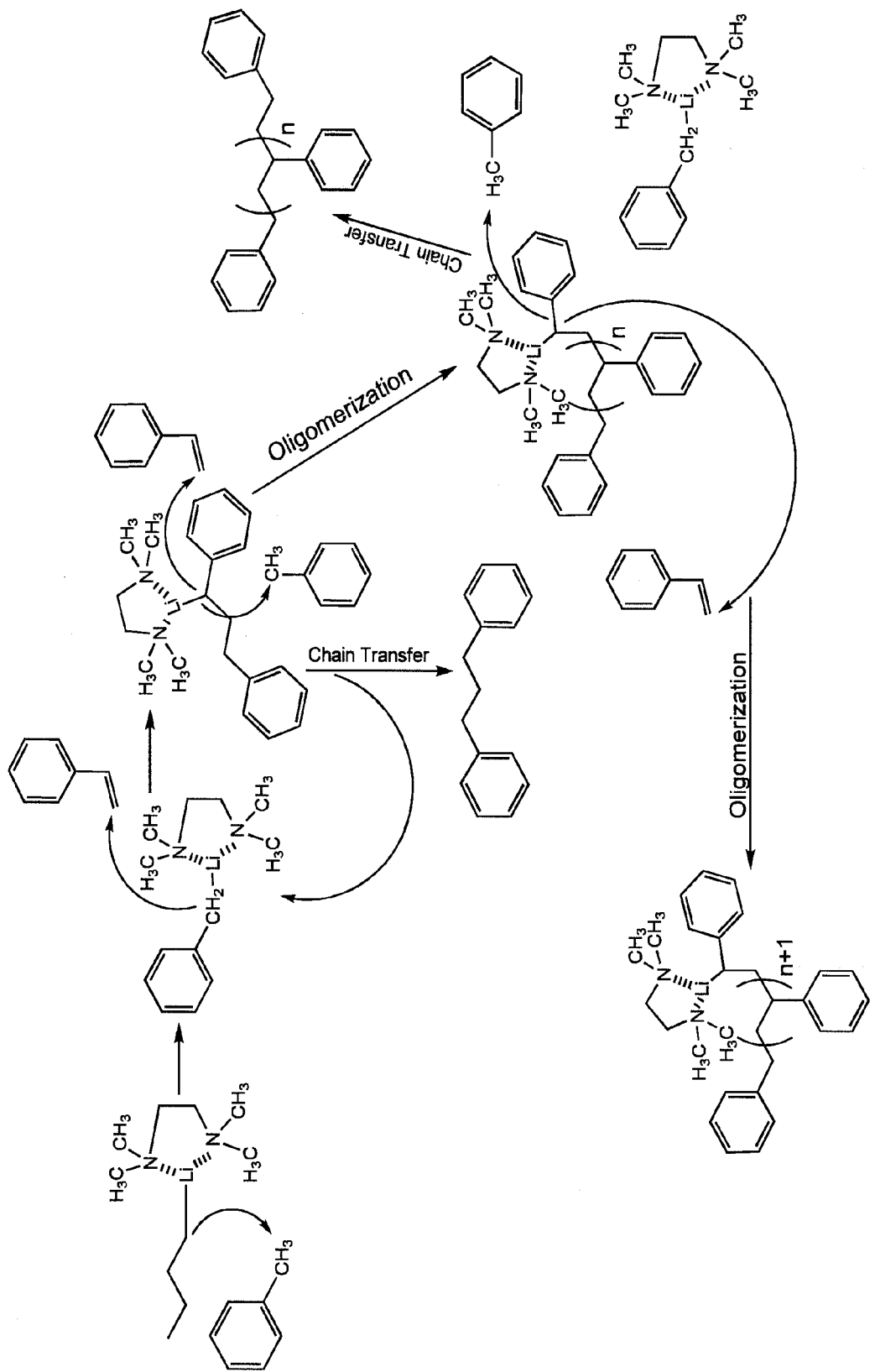

ADDUCTS, ADDUCTS AND OLIGOMERS, OR ADDUCTS, OLIGOMERS AND LOW MOLECULAR WEIGHT POLYMERS, AND THEIR PREPARATION

REFERENCE TO RELATED APPLICATIONS

This application is a Divisional of U.S. patent application Ser. No. 12/602,648, filed Dec. 1, 2009, now U.S. Pat. No. 8,420,876, which is the National Stage of International Patent Appl. No. PCT/US2008/066219, filed on Jun. 6, 2008, which in turn claims the benefit of U.S. Provisional Patent Appl. No. 60/942,599, filed on Jun. 7, 2007, the disclosures of which are incorporated herein by reference.

TECHNICAL FIELD

This invention relates, inter alia, to novel and useful (i) vinylaromatic adducts, (ii) mixtures of vinylaromatic adducts and vinylaromatic oligomers, and (iii) mixtures of vinylaromatic adducts, vinylaromatic oligomers, and low molecular weight vinylaromatic polymers, and novel process technology for producing such substances. These adducts and mixtures are desirable raw materials for preparation of brominated flame retardants

GLOSSARY

In connection with products of this invention and terminology used anywhere in this document, including the claims:
1) the term "adduct", whether in the singular or plural, denotes discrete molecules formed from addition of 1 to about 7 vinylaromatic units to a monomethylaromatic compound;
2) the term "oligomer", whether in the singular or plural, denotes vinylaromatic addition product(s) having a degree of polymerization in the range of about 8 to about 25;
3) the term "low molecular weight vinylaromatic polymer" whether in the singular or plural, denotes vinylaromatic addition product(s) having a degree of polymerization in the range of about 26 to about 80; and
4) the term "pseudo steady-state concentration" denotes a concentration of a kinetically active reactant or component, which concentration remains constant or substantially constant during the course of a reaction (other than startup and termination), although the reactant or component is continually being consumed and replenished. For example, when a reactant is being fed or introduced into a reaction mixture at the same rate that it is consumed, a pseudo steady-state concentration of that reactant is achieved. In the special case where the pseudo steady-state concentration is zero or substantially zero, this is achieved by feeding the component at a rate slower or about equal to but less than the rate at which it could otherwise be consumed, a feeding technique sometimes referred to as "starve feeding".

BACKGROUND

The following documents appear to illustrate the state of the art:
U.S. Pat. No. 6,008,283;
U.S. Pat. No. 6,657,028;
U.S. Pat. No. 6,759,478
Pines and Wunderlich, *J. Am. Chem. Soc.*, (1958), 80, 6001;
Eberhardt and Butte, *J. Org. Chem.* 29 2928, (1964), and *Polymer Preprints*, 13, 667, (1972);
A. L. Gatzke, *J. Polymer Science*, Part A-1, volume 7, pages 2281-2292, (1969);
Y. Tsukahara et al., *Polymer Journal*, Vol. 26, No. 9, pages 1013-1018 (1994); and
T. Mizuno et al., *Macromolecules*, 2005, 38, 4432-4437.

In the anionic polymerization of styrene, one mole of initiator is generally necessary to make one mole of polystyrene. Similarly, for making low molecular weight polymers and styrene oligomers, one mole of initiator per mole of oligomer or polymer is usually necessary. Thus, it would be a considerable economic advantage to produce many moles of polymer or oligomer (e.g., from about 2 to about 50) for each mole of initiator consumed. A need thus exists for an economical oligomerization process, likewise a low molecular weight polymerization process, that is capable of producing, under commercially-feasible conditions, oligomers or low molecular weight polymers that are well-suited for use in the preparation of effective oligomeric or low molecular weight polymeric flame retardants. This invention is deemed to make possible the fulfillment of this need, as well as making possible the production and isolation of distinct species of adducts which are themselves very useful as raw materials for the preparation by bromination of effective flame retardants.

SUMMARY OF THE INVENTION

Pursuant to this invention, an aromatic hydrocarbon can be aralkylated by a monovinylaromatic hydrocarbon to make, independently, various adducts and/or oligomers or low molecular weight polymers with high selectivity, higher conversion and very high catalyst utilization. Moreover, pursuant to this invention reaction conditions can be utilized which produce one or more discrete adducts to the exclusion of higher oligomers. So far as is known, aralkylation of toluene with styrene using catalytic quantities of lithium reagents complexed with poly(tertiary amine)s such as TMEDA is unknown to the art.

For enhanced performance in the intended end use applications of this invention, it is deemed important and hence desirable to produce products which have a monomodal uniform molecular weight distribution with limited variance, skewness and asymmetry. Variance, skewness and asymmetry are the parameters that are used to describe the breadth (standard deviation) and the shape (Gaussian or non-Gaussian) of a polymeric or oligomeric mixture molecular weight distribution curve (A. Rudin, The Elements of Polymer Science and Engineering, Academic Press, Orlando, 1982, pp. 54-58). Such curves are most conveniently generated by analysis of a polymeric or oligomeric mixture by Gel Permeation Chromatography (GPC).

$$\text{Variance} = (M_w M_n - M_n^2)$$

$$\text{Standard deviation } (S_n) = (M_w M_n - M_n^2)^{1/2}$$

$$\text{Skewness} = M_z M_w M_n - 3M_n^2 M_w + 2M_n^3$$

$$\text{Asymmetry or } {}_n\alpha_3 = (M_z M_w M_n - 3M_n^2 M_w + 2M_n^3)/(M_w M_n - M_n^2)^{3/2}$$

The present invention provides processes for maximizing chain transfer reactions such that novel low molecular weight polymeric, oligomeric, and adduct mixtures derived from vinylaromatic compounds such as styrene and a chain transfer agent (CTA) are produced with monomodal molecular weight distributions, low polydispersity (PD), small variances (standard deviation), and low asymmetry ($_n\alpha_3$).

For anionic polymerization of styrene, it is widely understood that polymerization will occur at a very controlled and uniform rate under certain process conditions and thereby produce a nearly monodispersed polymer, where the central tendency of the distribution or polydispersity (PD=$M_w/M_n$) approaches unity. Typically a polymeric product having a PD in the range of 1.04 to 1.1 can be routinely prepared. The degree of polymerization (DP) is easily predicted for a given polymerization process and can be described by the equation below.

$$DP = mole_{styrene}/mole_{initiator}$$

The DP is then used to calculate the expected molecular weight $M_{calc}$ as follows:

$$M_{calc} = DP(MW_{styrene}) + MW_{end\ group}$$

where $MW_{styrene}$ is the molecular weight of styrene monomer, and $MW_{end\ group}$ is the molecular weight of the alkyl fraction derived from the alkyllithium initiator.

For high polymers, this term ($MW_{end\ group}$) is generally ignored such that $M_{calc} = DP(MW_{styrene})$.

Prior to this invention, the extent of chain transfer could not be uniformly controlled in batch and in continuous processes to produce polystyrene with a normal or Gaussian molecular weight distribution with significant reduction in initiator consumption to produce low molecular weight polymers and oligomers where $M_{calc}/M_w$ is in the range of about 2 to about 50.

It is preferred that for the ratio $M_{calc}/M_n$ is in the range of about 2 to about 50. Thus for economical production of oligomers for use in producing new, highly effective brominated flame retardants, it is preferred that the ratio $M_{calc}/M_w$ (the quotient of the expected or calculated molecular weight in the absence of chain transfer and the weight average molecular weight) is on the order of about 2 to about 50. This represents about 100% to about 5000% improvement in initiator utilization and is of particular importance when making polymeric and oligomeric mixtures with $M_w$ less than or equal to about 4000 Daltons or atomic mass units.

A feature of this invention is that it makes possible, for the first time, the direct synthesis of various classes of related monoadducts, or mixtures of adducts, or mixtures of adducts and oligomers, or mixtures of adducts, oligomers and low molecular weight polymers in essentially the same process equipment from the same raw materials. Thus, this invention makes available new types of compositions which in many cases are themselves novel, and which, in at least most cases, are highly suitable for use as raw materials for production of brominated flame retardants. The lowest molecular weight adducts and in particular the monoadducts (1,3-diarylpropanes) producible by this invention are well suited as starting points for the synthesis of a host of products for various commercially-important applications. For example, this invention makes possible the direct economical synthesis of 1,3-diphenylpropane, a product which is not generally available in the marketplace. Other monoadducts can serve as building blocks for the synthesis of a myriad of new end products of potential commercial utility. In addition, mixtures comprising 1,3-diphenylpropane, 1,3,5-triphenylpentane, 1,3,5,7-tetraphenylheptane, and 1,3,5,7,9-pentaphenylnonane with a polydispersity greater than 1.25 can be conveniently prepared on an economical basis, and are well suited for bromination as flame retardants for polyurethane foam applications.

Separate brominations of adducts and also of oligomers producible by this invention have resulted in formation of effective flame retardant additives. Among the advantages of the brominated oligomers is low fat solubility. Brominated additives of this type, especially brominated adducts having on average 2 bromine atoms per aromatic ring per molecule, have been found to be soluble in various solvents, especially in isopropylated triphenylphosphates, thereby yielding highly effective, low scorch, mixed bromine-containing and phosphorus-containing flame retardants for use in flexible polyurethane foams. Such mixed bromine-containing and phosphorus-containing additives are also deemed useful as flame retardants for other polyurethane applications such as rigid foams. In particular, one of the brominated adducts enriched in 1,3,5-triphenylpentane producible by this invention has been found to be essentially as effective as a low-scorch flame retardant for flexible polyurethane foam as a commercially successful flame retardant which has been withdrawn from the market because of the perception of possible adverse health consequences.

The interdependent variables of this invention make the invention well suited for industrial application. The invention affords many options for conducting the process to obtain either the same product distributions under different process conditions or greatly different product distributions with only slight modification of the process conditions. Without wishing to be bound by theory, what is believed to be occurring in the processes of this invention is a balance between the rate for chain transfer and the rate for propagation; suitable selection of conditions and proportions of reagents will set the balance such that monoadducts, mixtures of adducts, or mixtures of adducts and oligomers, or mixtures of adducts, oligomers, and low molecular weight polymers are obtained.

Thus, in accordance with this invention, a process of preparing a reaction product enriched in (i) monoadduct, (ii) a mixture of adducts, (iii) a mixture of adducts and one or more oligomers, or (iv) a mixture of adducts, oligomers, and low molecular weight polymers is provided. The process comprises:

1) bringing together components A), B), C), and D) hereinafter described, by feeding at least component B) to a mixture formed at least from components A), C), and D), or to a mixture that is being formed by the feeding of at least components A), C), and D), in each case where components C) and D) are fed separately from each other and/or are fed as a complex formed or being formed from each other;

2) correlating the pseudo steady-state concentration of component B) in the reaction mixture during the feeding, the molar ratio of component A):component B) and maintaining the temperature or temperatures of the reaction mixture at one or more temperatures in the range of about 80° C. to about 130° C. to produce said reaction product; and 3) terminating the feed of component B) and then terminating the reaction;

wherein:

component A) is at least one aromatic hydrocarbon in which there is one and only one methyl group in the molecule, which methyl group is bonded to an aromatic ring, and in which at least one position on the aromatic ring bearing the methyl group is unsubstituted; preferably, component A) is an aromatic hydrocarbon moiety containing in the range of 1 to 4 aromatic rings and having in the range of 1 to 6 alkyl ring substituents, wherein not more than one of such substituents is a methyl group and wherein at least one position on the aromatic ring bearing the methyl group is unsubstituted; more preferably, component A) has one or two aromatic rings; still more preferably, component has one aromatic ring;

component B) is at least one monovinylaromatic hydrocarbon;

component C) is at least one organolithium reagent; and
component D) is at least one aliphatic poly(tertiary amine) ligand that complexes with said organolithium reagent.

This invention also provides compositions which are adducts or mixtures of adducts; mixtures comprising two or more adducts and one or more oligomers; and mixtures comprising adducts, oligomers, and low molecular weight polymers. The adducts or mixtures of adducts represented by the formula:

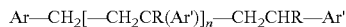
Ar—CH$_2$[—CH$_2$CR(Ar')]$_n$—CH$_2$CHR—Ar' wherein Ar is an aromatic hydrocarbon moiety which has only one methyl group and wherein at least one position on the aromatic ring bearing the methyl group is unsubstituted; Ar' is, independently, an aromatic hydrocarbon moiety; wherein R is a hydrogen atom or a methyl group, and n is a whole number in the range of 0 to 6. The mixtures comprising two or more adducts and one or more oligomers, which individual adducts and oligomer(s) of these mixtures can be represented by the formula:

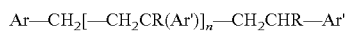
Ar—CH$_2$[—CH$_2$CR(Ar')]$_n$—CH$_2$CHR—Ar' wherein Ar, independently each Ar', and independently each R, is as defined above and n is a whole number in the range of 0 to 24. The mixtures comprising adducts, oligomers, and low molecular weight polymers, which individual adducts, oligomers, and low molecular weight polymers of these mixtures can be represented by the formula:

Ar—CH$_2$[—CH$_2$CR(Ar')]$_n$—CH$_2$CHR—Ar' wherein Ar, independently each Ar', and independently each R is as defined above and n is a whole number in the range of 0 to 79. In the compositions, Ar preferably contains in the range of 1 to 4 aromatic rings and has in the range of 1 to 6 alkyl ring substituents, and Ar' preferably contains in the range of 1 to 4 aromatic rings.

The above and other embodiments of this invention will be still further apparent from the ensuing description and appended claims.

BRIEF DESCRIPTION OF THE DRAWING

FIG. 1 depicts the proposed reaction mechanism of complexed lithium anion side-chain propagation and chain transfer reactions taking place upon reaction between toluene and styrene in the presence of an alkyllithium compound such as n-butyllithium complexed with an aliphatic tertiary diamine ligand such as N,N,N',N'-tetramethylethylenediamine.

FURTHER DETAILED DESCRIPTION OF EMBODIMENTS OF THE INVENTION

As used throughout this document, the term "producible" denotes a product produced by a reaction process described herein, concurrently or in the same reaction. In other words, the mixture products of this invention are preferably produced together in a single process, although such product can be obtained in other ways, such as by blending separately-formed substances.

In regard to the n and m values in the various formulae in this document, where the formula is described as representing an individual molecule, n and m are whole numbers. When the formula represents a plurality of molecules, n and m are average values, and thus can be fractional.

Component A) is an aromatic hydrocarbon in which there is one and only one methyl group in the molecule, which methyl group is bonded to an aromatic ring, and in which at least one position on the aromatic ring bearing the methyl group is unsubstituted. In general, for the processes of this invention, the hydrogen atoms of the methyl group need to be the most acidic protons in the molecule (i.e., they must have the lowest $pK_a$ value). Preferably, component A) is an aromatic hydrocarbon in which there is one and only one methyl group in the molecule, which methyl group is bonded to an aromatic ring, and in which at least one position on the aromatic ring bearing the methyl group is unsubstituted, which molecule contains in the range of 1 to 4 aromatic rings and has in the range of 1 to 6 alkyl ring substituents. A few non-limiting examples of compounds that can be utilized as component A) are toluene, p-butyltoluene, m-isopropyltoluene, o-ethyltoluene, 3,5-diethyltoluene, p-tert-amyltoluene, 3,4,5-triethyltoluene, 1-methyl-2-(3-phenylpropyl)benzene, 1-methyl-3-(3-phenylpropyl)benzene, and 1-methyl-4-(3-phenylpropyl)benzene. Preferred compounds for component A) are toluene, 1-methyl-2-(3-phenylpropyl)benzene, 1-methyl-3-(3-phenylpropyl)benzene, and 1-methyl-4-(3-phenylpropyl)benzene.

Component B) is a monovinylaromatic hydrocarbon, preferably a monovinylaromatic hydrocarbon having in the range of 1 to 4 aromatic rings in the molecule. Alkyl substituents can be present on the aromatic ring(s) of component B). A few non-limiting examples of vinylaromatic compounds that can be used as component B) are p-isopropylstyrene, 2,4-diethylstyrene, o-ethylstyrene, 3,5-di-isobutylstyrene, 2,6-dimethylstyrene, 2-ethyl-4-methylstyrene, 1-vinylnaphthalene, and 2-vinylnaphthalene.

Various organolithium reagents can be used as component C), either singly or in mixtures of two or more alkyllithium or cycloalkyllithium species. Preferably, the alkyllithium reagents contain in the range of 1 to about 5 carbon atoms in the molecule and the cycloalkyllithium reagents contain in the range of about 5 to about 7 carbon atoms in the molecule. More preferred are organolithium compounds which are available as articles of commerce. Particularly preferred are n-butyllithium and sec-butyllithium, especially when used individually rather than in combination. In addition, organolithium compounds other than alkyllithium compounds can be used. Non-limiting examples of such other organolithium compounds include phenyllithium, benzyllithium, 1-hexyl-1-phenyllithium, and polystyryllithium compounds which can be preformed or generated in situ.

Component D) is at least one aliphatic poly(tertiary amine) ligand that complexes with said organolithium reagent and which activates initiation, monoaddition (propagation), and chain transfer. Non-limiting examples of such poly(tertiary amine) ligands include di(tertiary amine) ligands derived from propylene diamine, and more preferably di(tertiary amine) ligands derived from ethylene diamine or from polyethylene imine N,N,N',N'-tetramethylethylenediamine is a particularly preferred aliphatic poly(tertiary amine) ligand in the practice of this invention.

Thus, in accordance with a first process embodiment of this invention, there is provided a process of preparing a product enriched in monoadduct of the formula:

Ar—CH$_2$CH$_2$CHR—Ar' wherein Ar is an aromatic hydrocarbon moiety containing in the range of 1 to 4 aromatic rings and having in the range of 1 to 6 alkyl ring substituents, wherein one of such substituents, and not more than one of such substituents, is a methyl group and wherein at least one position on the aromatic ring bearing the methyl group is unsubstituted; Ar' is, independently, an aromatic hydrocarbon moiety containing in the range of 1 to 4 aromatic rings; wherein R is a hydrogen atom or a methyl group, which process comprises:
I) feeding at least component B) hereinafter described into a mechanically agitated reactor containing either (1) a mixture formed from components A), C), and D) hereinafter described, which mixture optionally contains component B) in an amount about equal to or less than the amount of component C) or (2) a mixture (i.e., a heel) previously formed from components A), B), C), and D), and additional amounts of components A), C), and D) and optionally component B) in an amount less than the additional amount of component C) introduced into the reactor;
II) maintaining the feed rate of component B) at a slow enough rate such that the pseudo steady-state concentration of component B) is maintained at zero or at substantially zero, and maintaining the contents of the reactor at one or more temperatures in the range of about 90° C. to about 130° C. (preferably in the range of about 105° C. to about 115° C., and more preferably at reflux temperature when component A) is toluene); and
III) terminating the feed of component B) and then terminating the reaction, preferably with a protic solvent;
wherein:
  (i) the total amount of component B) introduced into the reactor relative to the amount of component A) introduced into the reactor is in the range of about 5 to about 70 mole percent of component A), preferably in the range of about 5 to about 50 mole percent of component A), and more preferably in the range of about 10 to about 30 mole percent of component A),
  (ii) the amount of component C) introduced into the reactor is in the range of about 10 to about 0.2 mole percent of component B), preferably in the range of about 1.25 to about 0.5 mole percent of component B), and still more preferably in the range of about 1 to about 0.67 mole percent of component B),
  (iii) the amount of component D) introduced into the reactor is in the range of about 10 to about 0.1 mole percent of component B), preferably in the range of about 1.25 to about 0.5 mole percent of component B), and still more preferably in the range of about 1 to about 0.67 mole percent of component B), and
  (iv) the molar ratio of component D) relative to component C) is in the range of about 0.8:1 to about 8:1, and preferably in the range of about 0.95:1 to about 1.05:1, especially when component D) is TMEDA; and
wherein:
component A) is at least one aromatic hydrocarbon in which there is one and only one methyl group in the molecule, which methyl group is bonded to an aromatic ring, and in which at least one position on the aromatic ring bearing the methyl group is unsubstituted;
component B) is at least one monovinylaromatic hydrocarbon;
component C) is at least one organolithium reagent; and
component D) is at least one aliphatic poly(tertiary amine) ligand that complexes with said organolithium reagent.
In preferred embodiments:
I) component A) has in the range of 1 to 4 aromatic rings and has in the range of 1 to 6 alkyl ring substituents;
II) component B) has in the range of 1 to 4 aromatic rings in the molecule;
III) component C) is an alkyllithium compound having in the range of 1 to about 5 carbon atoms, a cycloalkyllithium compound having in the range of about 5 to about 7 carbon atoms, phenyllithium, benzyllithium, and 1-hexyl-1-phenyllithium; and IV) component D) is A di(tertiary amine) ligand derived from propylene diamine, ethylene diamine, or polyethylene imine.
In more preferred embodiments:
1) component A) is toluene, toluene substituted by one or two alkyl groups, each of which contains at least 2 carbon atoms, toluene substituted by one or two phenethyl groups, toluene substituted by one or two 1-phenylpropyl ($C_6H_5$—$CH_2CH_2CH_2$—) groups, 1-methylnaphthalene, or 2-methylnaphthalene;
2) component B) is styrene, a ring alkylated styrene, α-methyl styrene, a ring alkylated α-methyl styrene, 1-vinylnaphthalene or 2-vinylnaphthalene;
3) component C) is an alkyllithium compound, preferably containing up to about 5 carbon atoms, phenyllithium, benzyllithium, or 1-phenylalkyllithium in which the alkyl group contains 1 to 5 carbon atoms;
4) component D) is TMEDA.
Pursuant to another embodiment of this invention, there are provided new and useful adducts that are producible by process technology of this invention. Such adducts include 1-phenyl-3-(o-tolyl)propane, 1-phenyl-3-(m-tolyl)propane, 1-phenyl-3-(m-tolyepropane, 1-phenyl-3-(p-tert-butylphenyl)propane, 1-phenyl-3-(p-ethylphenyl)propane, 1-(o-isopropylphenyl)-3-(p-tolyl)propane, 1-phenyl-3-(2,4,6-trimethylphenyl)propane, 1-phenyl-3-(1-napthyl)propane, 1-phenyl-3-(2-napthyl)propane, and 1,3,5,7,9-pentaphenylnonane.
Adducts which can be formed pursuant to this invention are illustrated by the following non-limiting examples.
1. Reaction between toluene and styrene forms 1,3-diphenylpropane as the initial adduct.
2. Reaction between toluene and o-methylstyrene forms 1-phenyl-3-(o-tolyl)propane as the initial adduct.
3. Reaction between toluene and m-methylstyrene forms 1-phenyl-3-(m-tolyl)propane as the initial adduct.
4. Reaction between toluene and p-methylstyrene forms 1-phenyl-3-(p-tolyl)propane as the initial adduct.
5. Reaction between toluene and p-tert-butylstyrene forms 1-phenyl-3-(p-tert-butylphenyl)propane as the initial adduct.
6. Reaction between p-ethyltoluene and styrene forms 1-phenyl-3-(p-ethylphenyl)propane as the initial adduct.
7. Reaction between o-isopropyltoluene and p-methylstyrene forms 1-(o-isopropylphenyl)-3-(p-tolyl)propane as the initial adduct.
8. Reaction between toluene and 2,4,6-trimethylstyrene forms 1-phenyl-3-(2,4,6-trimethylphenyl)propane as the initial adduct.
9. Reaction between toluene and 1-vinylnaphthalene and reaction between 1-methylnaphthalene and styrene forms 1-phenyl-3-(1-napthyl)propane.
10. Reaction between toluene and 2-vinylnaphthalene and reaction between 2-methylnaphthalene and styrene forms 1-phenyl-3-(2-napthyl)propane.
Higher molecular weight adducts other than those exemplified as in 1-10 above can also be formed and isolated. Thus, in general, the adducts can be represented by the formula:

wherein each Ar is, independently, an aromatic moiety which optionally contains alkyl substitution in which each alkyl group contains, independently, at least two carbon atoms, wherein R is a hydrogen atom or a methyl group, and wherein n is an average whole or fractional number in the range of about 1 to about 20. Among preferred specific adducts of this invention are 1,3,5,7-tetraphenylheptane, 1,3,5,7,9-pentaphenylnonane, and mixtures thereof.

A second process embodiment of this invention is process technology for producing mixtures of two or more adducts, which mixtures are substantially devoid of oligomers. The individual adducts of these mixtures can be represented by the formula:

wherein Ar, independently each Ar', and independently each R is as defined above and n is a whole number in the range of 0 to 6, which process is as described above for the first process embodiment, except that mixtures of two or more adducts are formed, oligomer formation is minimized, and the pseudo steady-state concentration of component B) is above zero.

Pursuant to another embodiment of this invention, there are provided new and useful mixtures of adducts that are producible by process technology of this invention. Such individual adducts of these mixtures can be represented by the formula:

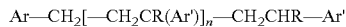

wherein Ar, independently each Ar', and independently each R is as defined above and n is a whole number in the range of 0 to 6. From at least some of these mixtures, certain portion can be isolated (e.g., by distillation) such that the isolated portion contains mixtures of adducts in which the values of n in the individual adduct formulas are consecutive numbers. Examples of such mixtures of adducts include binary mixtures where e.g., n=0 and 1, n=1 and 2, n=2 and 3, n=3 and 4; ternary mixtures where e.g., n=0, 1, and 2, n=1, 2, and 3; quaternary mixtures where e.g., n=0, 1, 2, 3, and 4, and so forth.

Other preferred mixtures of adducts include mixtures which comprise a particular adduct and one or more structural isomers of that adduct. Structural isomers are also called constitutional isomers. Examples of such mixtures include, but are not limited to, mixtures which comprise 1,3-diphenylpropane and at least about 0.005 wt % to about 5 wt % of 2-(2-phenylethyl)toluene, 3-(2-phenylethyl)toluene, and 4-(2-phenylethyl)toluene; mixtures which comprise 1,3,5-triphenylpentane and at least about 0.005 wt % to about 5 wt % of said mixture comprises structural isomers thereof, including a compound represented by the formula $CH_3C_6H_4CH_2CH_2(Ph)CH_2CH_2Ph$ (1-tolyl-2,4-diphenylbutane); mixtures which comprise 1,3,5,7-tetraphenylheptane and at least about 0.005 wt % to about 5 wt % of structural isomers thereof, including a compound represented by the formula $CH_3C_6H_4CH_2CH_2(Ph)CH_2CH_2(Ph)CH_2CH_2Ph$ (1-tolyl-2,4,6-triphenylhexane); mixtures which comprise 1,3,5,7,9-pentaphenylnonane and at least about 0.005 wt % to about 5 wt % of structural isomers thereof, including a compound represented by the formula $CH_3C_6H_4CH_2CH_2(Ph)$ $CH_2CH_2(Ph)CH_2CH_2(Ph)CH_2CH_2Ph$ (1-tolyl-2,4,6,8-tetraphenyloctane).

Still other preferred mixtures of adducts which comprise a particular adduct and one or more structural isomers of that adduct include, but are not limited to, mixtures which comprise 1-phenyl-3-(o-tolyl)propane and at least about 0.005 wt % of structural isomers thereof; mixtures which comprise 1-phenyl-3-(m-tolyl)propane; and at least about 0.005 wt % of structural isomers thereof; mixtures which comprise 1-phenyl-3-(p-tolyl)propane and at least about 0.005 wt % of structural isomers thereof; mixtures which comprise 1-phenyl-3-(p-tert-butylphenyl)propane and at least about 0.005 wt % of structural isomers thereof; mixtures which comprise 1-phenyl-3-(p-ethylphenyl)propane and at least about 0.005 wt % of structural isomers thereof; mixtures which comprise 1-(o-isopropylphenyl)-3-(p-tolyl)propane and at least about 0.005 wt % of structural isomers thereof; mixtures which comprise 1-phenyl-3-(2,4,6-trimethylphenyl)propane and at least about 0.005 wt % of structural isomers thereof; mixtures which comprise 1-phenyl-3-(1-napthyl)propane and at least about 0.005 wt % of structural isomers thereof; and mixtures which comprise 1-phenyl-3-(2-napthyl)propane and at least about 0.005 wt % of structural isomers thereof. More preferably, at least about 0.005 wt % to about 5 wt % of said mixture comprises at least one structural isomer of said compound.

A third process embodiment is a process of preparing a product mixture comprising two or more adducts and one or more oligomers, which mixtures are substantially devoid of polymers. The individual adducts and oligomer(s) of these mixtures can be represented by the formula:

wherein Ar, independently each Ar', and independently each R, is as defined above and n is a whole number in the range of 0 to 24, which process is as described above in the first process embodiment except that:

1) the feed rate of component B) is maintained such that
   a) the total amount of component B) introduced into the reactor is in the range of about 5 to about 100 mole percent, preferably in the range of about 5 to about 70 mole percent, relative to the amount of component A) introduced into the reactor, the pseudo steady-state concentration of component B) is above zero during all or substantially all of the feeding of component B), and the pseudo steady-state concentration of component B) is maintained to form oligomer with or without minimizing polymer formation; and maintaining the contents of the reactor at one or more temperatures in the range of about 85° C. to about 130° C., preferably in the range of about 85° C. to about 120° C.; or
   b) the total amount of component A) introduced into the reactor relative to the amount of component B) introduced into the reactor is in the range of about 5 to about 100 mole percent, preferably in the range of about 5 to about 50 mole percent of component B), and the pseudo steady-state concentration of component B) is maintained to form oligomer with or without minimizing polymer formation and maintaining the contents of the reactor at one or more temperatures in the range of about 80° C. to about 130° C., preferably in the range of about 85° C. to about 130° C.;
2) the pseudo steady-state concentration of component B) is above zero during all or substantially all of the feeding of component B), and the pseudo steady-state concentration of component B) is maintained to form oligomer while minimizing polymer formation; and
3) the contents of the reactor are maintained at one or more temperatures in the range of about 90° C. to about 130° C.

Polymer formation can be detected by increase of the differential rate of reaction mixture viscosity and by the differential rate of heat transfer. Adjusting the feed rate to the change in viscosity with time and the change in heat transfer with time can decrease or minimize polymer formation.

Pursuant to another embodiment of this invention, there are provided new and useful mixtures comprising two or more adducts and one or more oligomers that are producible by process technology of this invention. Such individual adducts and oligomer(s) of these mixtures can be represented by the formula:

wherein Ar, independently each Ar', and independently each R, is as defined above and n is a whole number in the range of 0 to 24. Preferred values for n are in the range of about 1 to about 20; more preferably, n is in the range of about 1 to about 9. From at least some of these mixtures, certain portions can be isolated (e.g., by distillation) such that the isolated portion contains components in which the values of n are within a certain range, e.g., 1-3, 1-4, 1-5, 1-6, and so forth. Preferred mixtures are those in which at least 35 weight percent, more preferably at least about 50 weight percent, of the mixture is composed of components in which n is in the range of 1 to about 5. Other preferred mixtures are those in which at least 20 weight percent, more preferably at least about 35 weight percent, of the mixture is composed of components in which n is in the range of 1 to about 3.

A fourth process embodiment of this invention is a process of preparing a product mixture comprising adducts, oligomers, and low molecular weight polymers. The individual adducts, oligomers, and low molecular weight polymers of these mixtures can be represented by the formula:

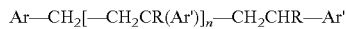

Ar—CH$_2$[—CH$_2$CR(Ar')]$_n$—CH$_2$CHR—Ar' wherein Ar, independently each Ar', and independently each R is as defined above in the first process embodiment and n is a whole number in the range of 0 to 79, which process is as described in the first process embodiment above except that:
1) the feed rate of component B) is maintained at a rate such that the total amount of component B) introduced into the reactor is in the range of about 5 to about 100 mole percent, preferably in the range of about 5 to about 70 mole percent, relative to the amount of component A) introduced into the reactor, the pseudo steady-state concentration of component B) is above zero during all or substantially all of the feeding of component B), and the pseudo steady-state concentration of component B) is maintained to form oligomer with or without minimizing polymer formation; and maintaining the contents of the reactor at one or more temperatures in the range of about 85° C. to about 130° C., preferably in the range of about 85° C. to about 120° C.; or
2) the total amount of component A) introduced into the reactor relative to the amount of component B) introduced into the reactor is in the range of about 5 to about 100 mole percent, preferably in the range of about 5 to about 50 mole percent of component B), and the pseudo steady-state concentration of component B) is maintained to form oligomer with or without minimizing polymer formation and maintaining the contents of the reactor at one or more temperatures in the range of about 80° C. to about 130° C., preferably in the range of about 85° C. to about 130° C.

Polymer formation occurs and the contents of the reactor are at one or more temperatures in the range of about 80° C. to about 130° C., and preferably in the range of about 85° C. to about 105° C. In this process, the pseudo steady-state concentration of component B) is maintained to form polymer at the expense of at least some oligomer formation, which polymer formation can be detected by increase of the differential rate of reaction mixture viscosity and by the differential rate of heat transfer. Polymer formation can be either increased (maximized) or decreased (minimized) by adjusting the feed rate to the change in viscosity with time and the change in heat transfer with time.

Pursuant to another embodiment of this invention, there are provided new and useful mixtures comprising adducts, oligomers, and low molecular weight polymers. The individual adducts, oligomers, and low molecular weight polymers of these mixtures can be represented by the formula:

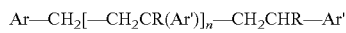

Ar—CH$_2$[—CH$_2$CR(Ar')]$_n$—CH$_2$CHR—Ar' wherein Ar, independently each Ar', and independently each R is as defined above in the first process embodiment and n is a whole number in the range of 0 to 79.

The reaction mixtures of this invention should have a liquid phase. If, in selecting components A), B), C), and D), a mixture is formed having a higher viscosity than desired or a higher solids content than desired, a suitable solvent can be used in suitably small quantities to provide a more fluid reaction mixture.

Preferably, the first and second process embodiments are conducted in the absence of any added solvent or in the presence of up to about 10 weight percent of a saturated aliphatic hydrocarbon solvent based on the total weight of the reaction mixture. Such amount of saturated aliphatic hydrocarbon solvent includes (a) solvent conventionally used to solubilize an organolithium reagent and/or (b) an additional quantity of saturated aliphatic hydrocarbon solvent used in feeding component B) into the reactor. In conducting the third and fourth process embodiments of this invention, it is preferred to utilize a viscosity-reducing solvent, preferably a solvent having one benzylic methylene unit per aromatic ring, especially ethylbenzene and/or 1,3-diphenylpropane. Also useful for reducing viscosity of the reaction mixture are propylbenzene, butylbenzene, and isobutylbenzene, which are articles of commerce of modest cost. Thus, the preferred solvents for use in reducing viscosity are ethylbenzene, 1,3-diphenylpropane, propylbenzene, butylbenzene, or isobutylbenzene, or mixtures of any two or more of these. Ethylbenzene or 1,3-diphenylpropane or mixtures thereof constitute more preferred solvents for use in the practice of this invention. It is to be noted that the benzylic methylene unit allows for the solvent to participate in the chemistry as a chain transfer agent akin to Component A), although presumably to a lesser extent, presumably due to the increased pK$_a$ of benzylic methylene protons of such hydrocarbons (recall that for the benzylic protons of ethylbenzene the pK$_a$ is 43, as compared to the pK$_a$=41 for the benzylic protons for toluene; see Hsieh and Quirk, p. 100 and p. 40, respectively).

Thus for example ethylbenzene, when added as a solvent, participates to a small extent in the processes of this invention, and small percentages of adducts, adducts and oligomers, and adducts, oligomers, and low molecular weight polymers having an ethylbenzene-derived end group (—CHMePh) can be made without deleterious effect upon the product mixture or the performance of its brominated derivatives. Similar behavior and analogous minor co-products are expected when propylbenzene, butylbenzene and/or isobutylbenzene are used as the solvent. In the case of 1,3-diphenylpropane, where component A) is toluene and component B) is styrene, adducts, adducts and oligomers, and adducts, oligomers, and low molecular weight polymers formed from 1,3-diphenylpropane and styrene are chemically identical to products formed from toluene and styrene and thus use of 1,3-diphenylpropane as an added solvent does not result in production of any different end product. The amount of solvent having one benzylic methylene unit per aromatic ring can be in the range of about 5 to about 50 weight percent of the total reaction mixture, and amounts in the range of about 10 to about 35 weight percent of the total reaction mixture are preferred. Solvent loadings outside these ranges are within the scope of this invention, but it is expected that such loading will be less effective and/or less economical. The mode of addition of the solvent is, generally speaking, a matter of choice and convenience and in any given situation can serve as a variable for optimization.

Other solvents that can be used for reducing the viscosity of the reaction mixture are solvents such as methylcyclohexane, cumene, and tert-butylbenzene, which solvents do not contain benzylic methylene units in the molecule. However, in using solvents such as these, the amount should be limited such that the chain transfer process is not materially inhibited which, as a consequence, leads to formation of higher molecular weight polymers possessing molecular weight distributions of high asymmetry. Tetrahydronaphthalene and diethylbenzenes are illustrative of another type of solvent which can be used for reducing the viscosity of the reaction mixture. In this case the molecular structure of such solvents contain more than one benzylic methylene unit per aromatic ring. Such a feature leads to branching in the product and leads to formation of branched or non-linear structures and wider molecular weight distributions. In view of the foregoing molecular structural characteristics of the solvents discussed in this paragraph, it is desirable, when utilizing such solvents to reduce viscosity of the reaction mixture, to limit the amount of such solvents. Amounts in the range of up to about 10 weight percent of the total reaction mixture are recommended for use in controlling viscosity of the reaction mixture.

Still another solvent containing only one benzylic methylene unit per aromatic ring that can be used to reduce viscosity of the reaction mixture is 1,2-diphenylethane. This solvent, while similar in structure to 1,3-diphenylpropane, can change the molecular architecture of the products produced in the processes of this invention and thus when used in the production of the oligomers or low molecular weight polymers of this invention, should be used in amounts in the range of up to about 10 weight percent of the total reaction mixture. It is to be noted that if 1,2-diphenylethane is used in the practice of this invention, oligomeric mixtures and/or low molecular weight polymer mixtures can be produced, having, for example, structures of the following formulas:

Ar'—CHR[—CH$_2$CR(Ar')]$_n$—CHPh-CHPh-[-CH$_2$CR(Ar')]$_m$—CH$_2$CHRAr'PhCH$_2$—CHPh-[-CH$_2$CR(Ar')]$_m$—CH$_2$CHRAr' where Ar', R, n and m are as described herein, and wherein Ph is a phenyl group.

In each of the formulas presented anywhere herein, when n is 1 or greater, R is preferably a hydrogen atom rather than a methyl group. When R is a hydrogen atom, there are no quaternary carbon atoms in the backbone of the molecule; when R is a methyl group, quaternary carbon atoms are present in the backbone of the molecule. Thus, it is preferred that the molecular backbone is free of quaternary carbon atoms. Compounds in which the molecular backbone is free of quaternary carbon atoms are more stable with regard to dealkylation under certain conditions, in particular during bromination with a Lewis acid catalyst. Such dealkylation reactions during bromination lead to formation of undesirable brominated aromatic hydrocarbons.

A feature of this invention is that the process technology of this invention makes possible the production of reaction products enriched in adducts, or in mixtures of adducts and oligomers, or in mixtures of adducts, oligomers, and low molecular weight polymers, all of which are well suited for use as raw materials for liquid phase bromination, thereby providing effective additive flame retardants for various substrates. Moreover, the adducts and the oligomers can be separated from each other without much difficulty by means of distillation or other methods (e.g., fractional precipitation) and then subjected to liquid phase bromination thereby offering the opportunity of providing different flame retardants for different end uses. Bromination of (i) the adducts, or (ii) the oligomers, or (iii) the low molecular weight polymers, or (iv) mixtures of (i) and (ii) or of (i), (ii), and (iii) is preferably conducted by using either an iron-based bromination catalyst or an aluminum-based bromination catalyst, but one or more other known Lewis acid bromination catalyst (e.g., antimony halide, etc.) can be used. The adducts and the lower molecular weight brominated oligomers are each readily soluble in liquid alkyl phosphate esters such as isopropylated phenyl phosphate thereby providing liquid flame retardant additive products containing bromine and phosphorus. Such mixed products are suitable for use as flame retardants, especially in polyurethanes and polyurethane foams.

As noted above, the chief reaction conditions to be controlled in order to produce reaction products enriched in particular types of products are the proportions between and among the monomethylaromatic compounds, vinylaromatic reactants, organolithium initiator, and the complexing ligand; the temperature of the reaction; and the rate at which the reactants are brought together.

As regards oligomeric and polymeric mixtures producible pursuant to this invention, those having the structure as set forth above and having polydispersities in the range of about 1.1 to about 4.0, and preferably in the range of about 1.1 to about 3.0, and more preferably in the range of about 1.1 to about 2.5 and in each case having a standard deviation of about 60 to about 2100 Daltons and $_n\alpha_3$ in the range of about −4.5 to about 4.5. More particularly, preferred oligomeric mixtures producible pursuant to this invention have a polydispersity in the range of about 1.1 to about 3.0, and preferably has a standard deviation in the range of about 60 to about 1600 Daltons and an asymmetry in the range of about −4.5 to about 4.5. Preferred polymeric mixtures producible pursuant to this invention have a polydispersity in the range of about 1.2 to about 3.0, and preferably have a standard deviation of about 160 to about 2100 Daltons and an asymmetry of about −4.5 to about 4.5. Such mixtures are preferred because of the compatibility of brominated flame retardants prepared from such oligomeric and polymeric mixtures in various polymers with which they are blended or physically incorporated. So far as is known, such oligomeric and polymeric mixtures have not been produced heretofore nor is there any previously known technology capable of directly synthesizing such oligomeric or polymeric mixtures having the aforementioned molecular weight distribution characteristics in a single stage reaction using catalytic quantities of an organolithium initiator.

It is to be noted that in forming adduct(s), mixtures of adducts and oligomer(s), or mixtures of adducts, oligomers, and low molecular weight polymers using process technology of this invention, small amounts of ring aralkylation products are typically formed. The amounts of such ring aralkylation products are typically less than 5 mole percent, and more usually less than 2 mole percent of the total amount of side chain aralkylation product(s) produced from the monomethylaromatic hydrocarbon, viz., component A), used in the process.

The character of such ring alkylation products is exemplified by the simplest member(s) of such materials. Such ring alkylation product(s) can include one or more products represented by the formula (s):

CH$_3$C$_6$H$_4$CH$_2$CH$_2$Ar'

CH$_3$C$_6$H$_4$(CH$_2$CH$_2$Ar'—)$_n$CH$_2$CH$_2$Ar'

Ar'CH$_2$CH$_2$(Ar'CH$_2$CH$_2$)$_m$CH$_2$C$_6$H$_4$(CH$_2$CH$_2$Ar'—)$_n$CH$_2$CH$_2$Ar' wherein each Ar' is, independently, as described above, n is a whole number, and m is a whole or fractional number, and the sum of m and n is equal to or less than 78. When the mixture comprises two or more adducts and one or more oligomers, at least about 0.005 wt % to less than about 5 wt % of the mixture is comprised of moieties represented by the formulae:

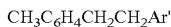

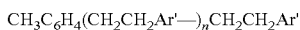

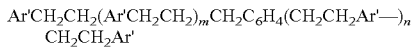

wherein Ar' is, independently, an aromatic hydrocarbon moiety, n is a whole number, m is a whole or fractional number, and the sum of m and n is equal to or less than about 24.

As articles of commerce, vinylaromatic compounds such as styrene contain inhibitors such as di-tert-butylcatechol. Such inhibitors react with the organolithium catalyst, reducing catalyst utilization. These inhibitors also cause the formation of emulsions when lithium hydroxide washes are performed on the products of the processes. Therefore it is recommended that such inhibitors be removed from component B) prior to use in the practice of this invention. In the case of vinylaromatic compounds inhibited with di-tert-butylcatechol, passing the vinylaromatic compound through aluminum oxide prior to feeding the vinylaromatic compound into the reactor effects such purification. Alternatively, other suitable adsorbents such as silica gel and various ion-exchange resins can be used to remove the di-tert-butylcatechol. It is desirable not to try to store the uninhibited vinylaromatic compound, as such compound can undergo polymerization in the storage vessel.

As those skilled in the art can appreciate, in as much as organolithium components are involved in the practice of this invention, the reactions should be conducted in an inert atmosphere which includes noble gases, nitrogen, and light hydrocarbons, or any mixture of any two or more of these materials. In light of the small amount of lithium reagent used, it is important to have dry reagents, dry gases, and gases and reagents free of or substantially free of oxygen and carbon dioxide.

In conducting the processes of this invention, there are numerous ways by which the components in the desired proportions can be charged into the reactor. Non-limiting examples of such modes of addition that can be used in the practice of this invention include the following:

1) Component B) is fed to the reactor containing a mixture at or close to reaction temperature formed from A), C), and D) which mixture is preferably formed by charging to the reactor at a temperature below about 80° C. in the order of A), then C), and then D).

2) Component B) is fed to the reactor containing a mixture at or close to reaction temperature formed by first charging A), then a portion of B) not to exceed 5 times the molar quantity of C), then charging C), and then charging D), which mixture is preferably formed at a temperature below about 80° C.

3) Components A), B), C), and D) are fed to the reactor containing a mixture at or close to reaction temperature formed, preferably at a temperature below about 80° C., from a portion of A), a portion of C), and a portion of D). In the case of a semi-batch reactor, it is desirable first to charge a small amount of the total desired amount of A), which small amount is at least the amount necessary to reach the agitator blade in a mechanically stirred reactor or the amount necessary to achieve agitation in a reactor equipped with a pump around loop. Then, C), followed by D), are charged, the total amount of C) and D) so charged is in the range of about 10 to about 50 percent of the total amount of C) and D) to be charged, and preferably in the range of about 20 and about 40 percent of the total amount of C) and D) to be charged. In the case of a continuous back-mix reactor, it is desirable at startup to first charge about 25 to about 100 percent of component A) and one full charge of C) and D) such that the desired relative proportions of A), C), and D) are achieved. Next, A), B), C), and D) are fed continuously to the reactor at a steady rate in their desired relative proportions, with an average residence time in the range of about 5 minutes to about 60 minutes. In each of the feeding modes described in this paragraph 3), components A), B), C), and D) are fed continuously to the reactors individually or in any subcombination(s) except that the amount of B) combined with C) in forming a feed containing C) should not exceed about 5 times the moles of C).

4) Components B), C), and D) are fed to a reaction mixture at or close to reaction temperature formed from A), C), and D), which mixture preferably is at a temperature below about 80° C. Such mixture is formed from all of component A), a portion of component C), and a portion of component D). In forming such mixture, it is desirable to first charge A) and then C), followed by D), the total amount of C) and D) so charged being in the range of about 10 to about 50 percent of the total amount of C) and D) to be charged, and preferably in the range of about 20 and about 40 percent of the total amount of C) and D) to be charged. Components B), C), and D) are fed continuously or in increments to the reactor individually or in any subcombination(s) except that the amount of B) combined with C) in forming a feed containing C) should not exceed about 5 times the moles of C) when producing a product enriched in oligomers and/or polymers. When producing adducts, the amount of B) combined with C) in forming a feed containing C) should not exceed about 2 times the moles of C), and preferably the molar ratio of B) to C) is equal to or less than 1:1.

5) Components A) and B) are fed to the reactor containing a mixture at or close to reaction temperature formed, preferably at a temperature below about 80° C., from a portion of A), all of component C), and all of component D). It is desirable first to charge at least a portion of the total desired amount of A), which portion is at least the amount necessary to reach the agitator blade in a mechanically stirred reactor or the amount necessary to achieve agitation in a reactor equipped with a pump around loop. It is also desirable that the amount of A) be sufficient to have a homogenous or at least substantially homogenous reaction mixture formed from that portion of A), and all of C), and all of D). Components A) and B) are fed continuously or in increments to the reactor individually or in any subcombination(s). The above modes of addition can be utilized in independent operations or in operations conducted in series. For example, a continuous back-mix reactor can overflow into a batch reactor or into a semi-batch reactor. Also, a continuous back-mix reactor can involve a series of continuous back-mix reactors. Other variations in modes of addition, e.g., use of a continuous plug-flow reaction schemes, will, by virtue of this disclosure, be readily apparent to those of ordinary skill in the art, and are within the scope of this invention as claimed.

Of the above modes of addition, those of 3) and 4) in which a portion of components C) and D) is fed with at least component B), are preferred because the average lifetime of the total amount of components C) and D) in the reactor is reduced. These modes of addition afford a more steady-state catalyst activity.

It will be understood and appreciated that there are instances in which small amounts of component B) may be present in the reactor in advance of the introduction of component C) or a complex formed from components C) and D). For example, in the event of incomplete reaction in a process operation conducted with recycle, an amount of B) may be contained in recycled component A). Another example is where a small amount of B) is intentionally introduced into the reactor containing at least A) prior to introduction of component C) as part of a procedure to determine the point at which water content in A) is eliminated. In such a procedure, after the water has been consumed by the addition of small increments of component C), the characteristic red color of a polystyryllithium appears and serves as an end point indicating an anhydrous condition has been achieved. In either or both of these examples, it is recommended that when making adducts the molar ratio of B) to that portion of C) to be charged at the outset should be equal to or less than 1:1. Also, when making mixtures enriched in oligomers and/or polymers, the amount of B) should be less than about 5 times the amount of that portion of C) to be charged at the outset. The situations described in this paragraph are real world advantageous situations in a plant operation conducted on an industrial scale and thus are within the spirit and scope of the invention herein claimed.

It is possible to utilize modes of operation involving feeding techniques other than those set forth in 1) through 5) above, which are presented for purposes of illustration and not limitation. Such other modes of operation will now be apparent to anyone skilled in the art upon reading the present disclosure.

In a particular situation where a material enriched in oligomers and/or low molecular weight polymers is produced by limiting the amount of component A) used relative to component B), a mixture of C) and D) is fed to the reactor concurrently with component B), and mixtures of C) and D) would come together to form insoluble complexes, it is desirable to combine C) and D) in a solvent. For this purpose, it is desirable to utilize an aromatic hydrocarbon solvent which has a single benzylic methylene unit per aromatic ring in the molecule and is devoid of methyl groups. Solvents of this type that are preferred for use in this particular situation include those which are in the liquid state at a temperature below about 80° C., and more preferably in the liquid state below about 30° C. Non-limiting examples of a few such solvents include ethylbenzene, propylbenzene, n-butylbenzene, isobutylbenzene, 1,3-diphenylpropane, and mixtures of any two or more of the foregoing.

At any time when introducing C) and D), independently or mixed, it is preferred to feed them subsurface. Conversely, it is preferred to feed component B) above the surface of the liquid reaction mixture as a finely divided mist, spray, or as a solution in a light hydrocarbon such as isopentane, cyclopentane, pentanes, normal pentane, low boiling petroleum ethers, or the like. An added benefit from using such light hydrocarbons is that they facilitate the removal of volatile amine(s) which may be produced by decomposition of the ligand in the course of the reaction. For example, when such light hydrocarbons are removed from the reactor as they are charged via fractional or simple distillation (flashing), volatile amine(s) are also removed. Alternatively, B) can be added to the reflux of A) in the event that A) or more volatile added solvent undergoes reflux.

In conducting the processes of this invention, the relative proportions of components A), B), C), and D) are controlled to produce the desired product(s). Thus:

generally speaking, in processes in which one or more adducts, or mixtures of adducts and oligomers, or mixtures of adducts, oligomers, and low molecular weight polymers are to be formed, the molar ratio of component A):component B) is typically in the range of about 20:1 to about 3:1, and preferably in the range of about 10:1 to about 4:1. For a constant molar ratio of component A):component B), as the ratio approaches 1:1, formation of higher molecular weight material is favored at faster feed rates. Conversely, formation of monoadduct is formed at the slowest feed rates.

generally speaking, in processes in which the product is to be enriched in oligomer, or enriched in oligomer and polymer, or enriched in polymer, the molar ratio of component A):component B) is typically in the range of about 1:1 to about 1:20, and preferably in the range of about 1:1 to about 1:7. Using a constant feed rate and a constant temperature, as the ratio of component A):component B) approaches 1:1, formation of lower molecular weight material is favored.

generally speaking, in processes in which one or more adducts are produced, or mixtures of adducts and oligomers, or mixtures of adducts, oligomers, and low molecular weight polymers are to be formed, the molar ratio of component B):component C) is typically in the range of about 10:1 to about 500:1, preferably in the range of about 80:1 to about 180:1, and more preferably in the range of about 100:1 to about 150:1. Using (i) a constant molar ratio of component B):component A), (ii) a constant feed rate of component B), and (iii) a constant temperature as the ratio of component B):component C) approaches 10:1, formation of lower molecular weight material is favored. Conversely, formation of higher molecular weight material is favored when holding the same parameters (i), (ii), (iii) constant as the ratio of component B):component C) approaches 500:1.

generally speaking, in processes in which one or more adducts are produced, or mixtures of adducts and oligomers, or mixtures of adducts, oligomers, and low molecular weight polymers are to be formed, the molar ratio of component B):component D) is typically in the range of about 10:1 to about 500:1, preferably in the range of about 80:1 to about 180:1, and more preferably in the range of about 100:1 to about 150:1, and the molar ratio of component C):component D) is typically in the range of about 1:8 to about 1:0.90, and preferably in the range of about 1:1.1 to about 1:0.9 and more preferably in the range of about 1:1.05 to about 1:0.95.

The temperature of the reaction mixture formed from the above components should be at a temperature above 50° C., more desirably in the range of about 60° C. to about 135° C., and preferably in the range of about 105° C. to about 115° C. when high rate of chain transfer is needed to produce the desired product distribution, and conversely, the temperature is preferably in the range of about 80° C. to about 105° C. when a reduced rate of chain transfer is needed to produce the desired product distribution. Brief excursions outside of such temperature ranges are permissible and within the scope of this invention provided such excursions do not materially interfere with the desired reactions taking place.

As shown by the Examples presented hereinafter, feed rates, relative component molar ratios, and reaction temperatures are all interdependent variables such that varying only one of them while holding the others constant will produce different product distributions within the scope of this invention. Conversely, changing any two or more of these variables while holding the others constant can produce nearly identical product distributions. Thus, the Examples presented hereinafter constitute an excellent template for establishing reaction conditions and process parameters to produce any given product or product distribution within the confines of what is industrially practical. However, in any case where the parameters needed for producing a particular product or product distribution have not been fully established, all that is required is to perform a few optimization experiments based on the information given in the Examples in order to develop such parameters.

Again not wanting to be bound by theory, one can explain the results observed (at least in the Examples, below) in terms of competing reaction rates. In the simplest embodiment of this invention, the simplest product is represented by the formula:

To maximize its formation, it is necessary to keep the monomer concentration very low relative to the concentration of the chain transfer agent. This is accomplished by feeding the monovinylaromatic hydrocarbon (e.g., styrene) to a large excess of the chain transfer agent (the monomethylaromatic compound) at relatively slow rates. The rate of product formation and hence the rate of consumption of the monovinylaromatic hydrocarbon shows a functional dependence on the initiator concentration. Consequently the higher the concentration of the tertiary-polyamine-complexed organolithium reagent, the faster the monovinylaromatic hydrocarbon is consumed. This in effect keeps the monovinylaromatic hydrocarbon concentration low and hence helps the chain transfer reaction to compete with adduct formation. The rate of chain transfer increases with increasing temperature. To maximize the rate of chain transfer, the process is conducted at the highest temperature practicable. The upper limit of temperature is normally governed by the stability of the tertiary-polyamine-complexed organolithium reagent. At temperatures much above about 115° C., decomposition of the organolithium complex occurs, which leads to chain termination processes.

For economic reasons one would choose to balance feed rate (time to conduct the process) of the monomer (e.g., monovinylaromatic hydrocarbon) with the initiator concentration (cost of raw material) and the amount of chain transfer agent (monomethyaromatic compound) consumed (effort to recover and recycle).

The reactions of this invention are deemed complete when all of component B) is consumed. This is most conveniently determined by proton NMR or less conveniently determined using gas chromatography and then only when mixtures of one or more adducts are produced free of oligomers. In the event that small quantities of styrene are present (up to about 2 wt % of the total reaction mixture), at the end of the feed—as can sometimes occur in modes of addition numbered 1) and 2) above—and a small portion (in the range of 1% to 5%) of the total amount of component C) or an admixture of component C) and component D) can be charged to complete the reaction. Typically, contacting the reaction mixture with a quenching agent, e.g., a protic solvent such as water and/or an alcohol, terminates the reaction. This can be done by slowly introducing the quenching agent to the reactor containing the reaction mixture. Alternatively, the reaction mixture can be transferred to another stirred reaction vessel containing the quenching agent and optionally a solvent. Solutions of mineral and organic acids can be used as well, but to avoid emulsions it is recommended that the aqueous phase of the acid be at or above a pH of about 5.

Generally speaking, there are two situations for which somewhat different work-up procedures are recommended:
1) In cases where the reaction mixture is formed using a large molar quantity of component A) relative to component B) or when a large quantity (greater than about 25 wt % of the total mass) of added solvent is employed (e.g., ethylbenzene or 1,3-diphenylpropane) it is generally convenient to transfer the reaction mixture to a mechanically stirred reaction vessel containing a nitrogen atmosphere and water. The first charge of water should be in the range of about 5% to about 50% and preferably about 15% to about 25% of the combined mass of component A) component B) and any added solvent. The resulting two phase reaction mixture is stirred at about 70° C. to about 90° C. for a period of time generally about 0.25 hours to about 1.0 hour. Agitation is interrupted and the aqueous phase is removed. This wash procedure is typically repeated one or more times until the concentration of lithium hydroxide in the organic phase is reduced to less than 50 ppm. The formation of an essentially clear organic phase and a pH<10 of the aqueous wash is indicative that the organic solution is free of lithium. The reaction mass is then stripped at reduced pressure to recover component A) and/or the added solvent.
2) In cases of this invention where mixtures enriched in oligomers or enriched in low molecular weight polymers are produced using a limiting portion of component A) (typically the molar ratio of component A) to component B) is greater than about 1:1) and with an added solvent in the portion of less than about 25 wt % of the total reaction mass, it is convenient to transfer the reaction mixture to a mechanically stirred reactor containing sufficient hydrocarbon solvent to make about a 50 wt % to about 25 wt % solution of the product in the solvent. In the case where no added solvent was used and component A) is toluene, then toluene is the solvent of choice. In the case where ethyl benzene was the added solvent, then ethyl benzene would be a preferred solvent. Other preferred hydrocarbon solvents include cyclohexane and methylcyclohexane. It is convenient if in addition to solvent the stirred reactor is charged with water before transferring the reaction mixture. The first charge of water should be in the range of about 5% to about 50% and preferably about 15% to about 25% of the combined mass of component A), component B) and any added solvent. The resulting two phase reaction mixture is stirred at about 70° C. to about 90° C. for a period of time generally about 0.25 hours to about 1.0 hour. Agitation is interrupted and the aqueous phase is removed. This wash procedure is repeated one or more times until the concentration of lithium hydroxide in the organic phase is reduced to less than 50 ppm. The formation of an essentially clear organic phase and a pH<10 of the aqueous wash is indicative that the organic solution is free of lithium. The reaction mass is then stripped at reduced pressure to recover the bulk of component A) all added solvent (ending conditions are generally 230° C. and <5 mmHg).

For work-up of material enriched in adducts, it is convenient to isolate the lowest boiling adducts by means of vacuum distillation either in a batch or continuous operation. A preferred method employs a wiped film evaporator (WFE) or a series of wiped film evaporators. From the adduct-enriched material, adducts where n is equal to 0 to 3 can generally be removed overhead as one distillate fraction by passing the adduct-enriched material through a WFE operating at <0.5 mmHg and about 280° C. to about 300° C. Isolation of enriched cuts of the lighter adducts can be achieved by passing the distillate fraction through the WFE (or through a further WFE when the WFEs are in series) at a lower temperature. The conditions which include feed rate, surface area of the apparatus, vacuum and temperature to provide cuts greatly enriched in any one adduct can be readily determined. The heavy ends or undistilled material is comprised predominately of adducts where n=4 to 7 or adducts and oligomers where n=4 to 12. Further purification of the adducts having n=0-3 obtained from the WFE can be achieved by fractional distillation at reduced pressure.

For work-up of material enriched in oligomers and/or low molecular weight polymers (i.e., mixtures of adducts and oligomers or mixtures of adducts, oligomers and low molecular weight vinylaromatic polymers), further removal of solvent from the mixture can include: 1) passing the material through a column as a falling film at elevated temperature with a countercurrent flow of hot (about 220° C. to about 260° C.; preferably about 220° C.) nitrogen or other inert gas; or 2) passing the material through a wiped film evaporator at elevated temperature and reduced pressure; or 3) passing the material through a devolatilization extruder; or 4) ultra-filtration using membranes suitable for separating macromolecules (oligomers and polymers) from low molecular weight molecules; or 5) precipitation of the oligomers and polymers via introduction of the material as a melt into a well-agitated (high shear) organic anti-solvent (such as methanol), then collecting the precipitated polymer by filtration or decantation. Option 5) is a less preferred technique for further work-up of material enriched in oligomers and/or low molecular weight polymers.

Separation of oligomers and adducts from each other is preferably achieved by distillation. In conducting the distillation, any low-boiling components, e.g., unreacted toluene or other relatively low-boiling monomethylaromatic hydrocarbon reactant(s), are initially removed from the mixture. The next higher fractions typically involve the lower molecular weight adducts, e.g., 1,3-diphenylpropane, 1,3,5-triphenylpentane, and analogs of these containing one or more lower alkyl substituents containing at least two carbon atoms each (e.g., ethyl, propyl, or like lower alkyls) on one or more of the aromatic rings. The distillation pot residue is typically at least one and usually a mixture of the oligomers of this invention. Although distillation is a preferred method of effecting separation, other procedures such as chromatography or solvent extraction can be used for making the separations when such separations are desired. Instead of making a separation between adducts and oligomers prior to bromination, a light distillation can be used to remove any light ends such as unreacted toluene or other relatively low-boiling monomethyl-substituted aromatic hydrocarbon reactant(s). The remaining mixture of adducts and oligomers of this invention can then be subjected to bromination. Here again, the resultant brominated mixture(s) can be used as a brominated flame retardant additive for use in polymers, resins, and coatings.

In all cases where material is produced and isolated without distillation, it is convenient to remove trace amine impurities after dissolution of the material in a solvent by passing the solution through the acid form of a strongly acidic cation exchange resin prior to bromination. Other adsorbents for amines can be employed such as acidic alumina or silica gel. When the material is to be brominated, the material can be dissolved in the solvent to be used for the bromination and then passed through the cation exchange resin or other adsorbent.

Non-limiting examples of monoadducts of this invention are depicted in Table 1. The monoadducts shown in Table 1 are formed upon reaction of the particular component A) of the left hand column with the particular component of the particular component B) of the top row of the table; these monoadducts can be isolated. For example, upon reaction of toluene with styrene, the initial isolatable product of the reaction is 1,3-diphenylpropane (i.e., the compound shown in the section of Table 1 where toluene and styrene intersect in Table 1). More complex 1,3-diarylpropanes are formed by this invention when substituted methylbenzenes and/or substituted styrenes are employed (i.e., in the methylbenzenes and the monovinylaromatic hydrocarbons in Table 1 below, each R is, independently, an alkyl group having at least two carbon atoms). It will be understood that Table 1 merely represents a few of the monoadducts producible by the practice of this invention. Moreover, for the purpose of making a brominated flame retardant, up to a total of four positions on either or both of the phenyl groups of the initial products of the reaction can be occupied by alkyl groups having in the range of 1 to 4 carbon atoms as long as steric hindrance permits such substitution. If a brominated flame retardant is not the desired use for these products, all five positions on either or both of the phenyl groups of the initial products of the reaction can be occupied by alkyl groups having in the range of 1 to 4 carbon atoms as long as steric hindrance permits such substitution.

Processes of this invention include:

AA). A process of preparing a reaction product enriched in (i) monoadduct, (ii) a mixture of adducts, (iii) a mixture of adducts and one or more oligomers, or (iv) a mixture of adducts, oligomers, and low molecular weight polymers, which process comprises:
1) bringing together components A), B), C), and D) hereinafter described, by feeding at least component B) to a mixture formed at least from components A), C), and D), or to a mixture that is being formed by the feeding of at least components A), C), and D), in each case where components C) and D) are fed separately from each other and/or are fed as a complex formed or being formed from each other;
2) correlating the pseudo steady-state concentration of component B) in the reaction mixture during the feeding, the molar ratio of component A):component B) and maintaining the temperature or temperatures of the reaction mixture at one or more temperatures in the range of about 80° C. to about 130° C. to produce said reaction product; and
3) terminating the feed of component B) and then terminating the reaction;
wherein:
component A) is at least one aromatic hydrocarbon in which there is one and only one methyl group in the molecule, which methyl group is bonded to an aromatic ring, and in which at least one position on the aromatic ring bearing the methyl group is unsubstituted;
component B) is at least one monovinylaromatic hydrocarbon;
component C) is at least one organolithium reagent; and
component D) is at least one aliphatic poly(tertiary amine) ligand that complexes with said organolithium reagent.

AB). A process as in AA) for preparing a product enriched in monoadduct of the formula:

Ar—CH$_2$CH$_2$CHR—Ar' wherein Ar is an aromatic hydrocarbon moiety containing in the range of 1 to 4 aromatic rings and having in the range of 1 to 6 alkyl ring substituents, wherein one of such substituents, and not more than one of such substituents, is a methyl group and wherein at least one position on the aromatic ring bearing the methyl group is unsubstituted; Ar' is, independently, an aromatic hydrocarbon moiety containing in the range of 1 to 4 aromatic rings; wherein R is a hydrogen atom or a methyl group, which process comprises:
I) feeding at least component B) hereinafter described into a mechanically agitated reactor containing either (1) a mixture formed from components A), C), and D) hereinafter described, which mixture optionally contains component B) in an amount about equal to or less than the amount of component C) or (2) a mixture previously formed from components A), B), C), and D), and additional amounts of components A), C), and D) and optionally component B) in an amount less than the additional amount of component C) introduced into the reactor;

II) maintaining the feed rate of component B) at a slow enough rate such that the pseudo steady-state concentration of component B) is maintained at zero or at substantially zero, and maintaining the contents of the reactor at one or more temperatures in the range of about 90° C. to about 130° C.; and III) terminating the feed of component B) and then terminating the reaction;

wherein:
  (i) the total amount of component B) introduced into the reactor relative to the amount of component A) introduced into the reactor is in the range of about 5 to about 70 mole percent of component A),
  (ii) the amount of component C) introduced into the reactor is in the range of about 10 to about 0.1 mole percent of component B),
  (iii) the amount of component D) introduced into the reactor is in the range of about 10 to about 0.1 mole percent of component B), and
  (iv) the molar ratio of component D) relative to component C) is in the range of about 0.8:1 to about 8:1.

AC). A process as in AA) for preparing a product enriched in a mixture of two or more adducts in which oligomer formation is minimized, the individual adducts of such mixtures being represented by the formula:

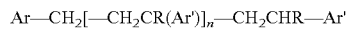

Ar—CH$_2$[—CH$_2$CR(Ar')]$_n$—CH$_2$CHR—Ar' wherein Ar is an aromatic hydrocarbon moiety containing in the range of 1 to 4 aromatic rings and having in the range of 1 to 6 alkyl ring substituents, wherein one of such substituents, and not more than one of such substituents, is a methyl group and wherein at least one position on the aromatic ring bearing the methyl group is unsubstituted; Ar' is, independently, an aromatic hydrocarbon moiety containing in the range of 1 to 4 aromatic rings; wherein R is a hydrogen atom or a methyl group, and wherein and n is a whole number in the range of 0 to 6, which process comprises:

I) feeding at least component B) hereinafter described into a mechanically agitated reactor containing either (1) a mixture formed from components A), C), and D) hereinafter described, which mixture optionally contains component B) in an amount about equal to or less than the amount of component C) or (2) a mixture previously formed from components A), B), C), and D), and additional amounts of components A), C), and D) and optionally component B) in an amount less than the additional amount of component C) introduced into the reactor;

II) maintaining the feed rate of component B) at a rate such that the pseudo steady-state concentration of component B) is above zero, and maintaining the contents of the reactor at one or more temperatures in the range of about 90° C. to about 130° C.; and III) terminating the feed of component B) and then terminating the reaction;

wherein:
  (i) the total amount of component B) introduced into the reactor relative to the amount of component A) introduced into the reactor is in the range of about 5 to about 70 mole percent of component A),
  (ii) the amount of component C) introduced into the reactor is in the range of about 10 to about 0.1 mole percent of component B),
  (iii) the amount of component D) introduced into the reactor is in the range of about 10 to about 0.1 mole percent of component B), and
  (iv) the molar ratio of component D) relative to component C) is in the range of about 0.8:1 to about 8:1.

AD). A process as in AA) for preparing a product enriched in two or more adducts and one or more oligomers in which polymer formation is minimized, the individual adducts and oligomer(s) of such mixtures being represented by the formula:

Ar—CH$_2$[—CH$_2$CR(Ar')]$_n$—CH$_2$CHR—Ar' wherein Ar is an aromatic hydrocarbon moiety containing in the range of 1 to 4 aromatic rings and having in the range of 1 to 6 alkyl ring substituents, wherein one of such substituents, and not more than one of such substituents, is a methyl group and wherein at least one position on the aromatic ring bearing the methyl group is unsubstituted; Ar' is, independently, an aromatic hydrocarbon moiety containing in the range of 1 to 4 aromatic rings; wherein R is a hydrogen atom or a methyl group, and wherein n is a whole number in the range of 0 to 24, which process comprises:

I) feeding at least component B) hereinafter described into a mechanically agitated reactor containing either (1) a mixture formed from components A), C), and D) hereinafter described, which mixture optionally contains component B) in an amount about equal to or less than the amount of component C) or (2) a mixture previously formed from components A), B), C), and D), and additional amounts of components A), C), and D) and optionally component B) in an amount less than the additional amount of component C) introduced into the reactor;

II) maintaining the feed rate of component B) at a rate such that either
  (1) the total amount of component B) introduced into the reactor is in the range of about 5 to about 100 mole percent relative to the amount of component A) introduced into the reactor, the pseudo steady-state concentration of component B) is above zero during all or substantially all of the feeding of component B), and the pseudo steady-state concentration of component B) is maintained to form oligomer with or without minimizing polymer formation; and maintaining the contents of the reactor at one or more temperatures in the range of about 85° C. to about 130° C.; or
  (2) the total amount of component A) introduced into the reactor relative to the amount of component B) introduced into the reactor is in the range of about 5 to about 100 mole percent of component B), and the pseudo steady-state concentration of component B) is maintained to form oligomer with or without minimizing polymer formation and maintaining the contents of the reactor at one or more temperatures in the range of about 80° C. to about 130° C.; and III) terminating the feed of component B) and then terminating the reaction;

wherein:
  (ii) the amount of component C) introduced into the reactor is in the range of about 10 to about 0.1 mole percent of component B),
  (iii) the amount of component D) introduced into the reactor is in the range of about 10 to about 0.1 mole percent of component B), and
  (iv) the molar ratio of component D) relative to component C) is in the range of about 0.8:1 to about 8:1.

AE). A process as in AA) for preparing a product mixture comprised of adducts, oligomers, and low molecular weight polymers, the individual adducts, oligomers, and low molecular weight polymers of such mixtures being represented by the formula:

wherein Ar is an aromatic hydrocarbon moiety containing in the range of 1 to 4 aromatic rings and having in the range of 1 to 6 alkyl ring substituents, wherein one of such substituents, and not more than one of such substituents, is a methyl group and wherein at least one position on the aromatic ring bearing the methyl group is unsubstituted; Ar' is, independently, an aromatic hydrocarbon moiety containing in the range of 1 to 4 aromatic rings; wherein R is a hydrogen atom or a methyl group, and wherein n is a whole number in the range of 0 to 79, which process comprises:

I) feeding at least component B) hereinafter described into a mechanically agitated reactor containing either (1) a mixture formed from components A), C), and D) hereinafter described, which mixture optionally contains component B) in an amount about equal to or less than the amount of component C) or (2) a mixture previously formed from components A), B), C), and D), and additional amounts of components A), C), and D) and optionally component B) in an amount less than the additional amount of component C) introduced into the reactor;

II) maintaining the feed rate of component B) at a rate such that either
  (1) the total amount of component B) introduced into the reactor is in the range of about 5 to about 100 mole percent relative to the amount of component A) introduced into the reactor, the pseudo steady-state concentration of component B) is above zero during all or substantially all of the feeding of component B), and the pseudo steady-state concentration of component B) is maintained to form oligomer with or without minimizing polymer formation; and maintaining the contents of the reactor at one or more temperatures in the range of about 85° C. to about 130° C.; or
  (2) the total amount of component A) introduced into the reactor relative to the amount of component B) introduced into the reactor is in the range of about 5 to about 100 mole percent of component B), and the pseudo steady-state concentration of component B) is maintained to form oligomer with or without minimizing polymer formation and maintaining the contents of the reactor at one or more temperatures in the range of about 80° C. to about 130° C.; and III) terminating the feed of component B) and then terminating the reaction;
wherein:
  (ii) the amount of component C) introduced into the reactor is in the range of about 10 to about 0.1 mole percent of component B),
  (iii) the amount of component D) introduced into the reactor is in the range of about 10 to about 0.1 mole percent of component B), and
  (iv) the molar ratio of component D) relative to component C) is in the range of about 0.8:1 to about 8:1.

AF). A process as in any of AA)-AE) wherein component A) is (i) toluene, (ii) toluene substituted by one or two alkyl groups, each of which contains at least 2 carbon atoms, (iii) toluene substituted by one or two phenethyl groups, (iv) toluene substituted by one or two 1-phenylpropyl ($C_6H_5$—$CH_2CH_2CH_2$—) groups, (v) 1-methylnaphthalene, or (vi) 2-methylnaphthalene.

AG). A process as in any of AA)-AE) wherein component B) is (a) styrene, (b) a ring alkylated styrene, (c) α-methyl styrene, (d) a ring alkylated α-methyl styrene, (e) 1-vinylnaphthalene or (f) 2-vinylnaphthalene.

AH). A process as in any of AA)-AE) wherein component C) is an alkyllithium compound, phenyllithium, benzyllithium, or 1-phenylalkyllithium in which the alkyl portion contains 1 to 5 carbon atoms.

AI). A process as in AH) wherein component D) is N,N,N',N'-tetramethylethylenediamine AJ). A process as in any of AA)-AE) wherein:
  component A) is (i) toluene, (ii) toluene substituted by one or two alkyl groups, each of which contains at least 2 carbon atoms, (iii) toluene substituted by one or two phenethyl groups, (iv) toluene substituted by one or two 1-phenylpropyl ($C_6H_5$—$CH_2CH_2CH_2$—) groups, (v) 1-methylnaphthalene, or (vi) 2-methylnaphthalene;
  component B) is (a) styrene, (b) a ring alkylated styrene, (c) α-methyl styrene, (d) a ring alkylated α-methyl styrene, (e) 1-vinylnaphthalene or (f) 2-vinylnaphthalene; and
  component C) is an alkyllithium compound, phenyllithium, benzyllithium, or 1-phenylalkyllithium in which the alkyl portion contains 1 to 5 carbon atoms.

AK). A process as in any of AA)-AE) wherein:
I) component A) contains in the range of 1 to 4 aromatic rings and has in the range of 1 to 6 alkyl ring substituents;
II) component B) has in the range of 1 to 4 aromatic rings in the molecule;
III) component C) is an alkyllithium compound having in the range of 1 to about 5 carbon atoms, a cycloalkyllithium compound having in the range of about 5 to about 7 carbon atoms, phenyllithium, benzyllithium, and 1-hexyl-1-phenyllithium; and
IV) component D) is A di(tertiary amine) ligand derived from propylene diamine, ethylene diamine, or polyethylene imine.

AL). A process as in AG) wherein component D) is N,N,N',N'-tetramethylethylenediamine AM). A process as in any of AA)-AD) wherein said temperature is in the range of about 105° C. to about 115° C.

AN). A process as in any of AA)-AD) wherein said temperature is reflux temperature, and wherein component A) is toluene.

AO). A process as in AD) wherein component B) is in the range of about 15 to about 100 mole percent of component A).

AP). A process as in AE) wherein in (2) the temperature is in the range of about 85° C. to about 90° C.

AQ). A process as in AE) wherein component B) is in the range of about 5 to about 70 mole percent of component A).

AR). A process as in any of AA)-AE) which has at least one of the following features:
  the total amount of component B) introduced into the reactor relative to the amount of component A) introduced into the reactor is in the range about 10 to about 30 mole percent of component A);
  the amount of component C) introduced into the reactor is in the range of about 1 to about 0.5 mole percent of component B);
  the amount of component D) introduced into the reactor is in the range of about 1 to about 0.5 mole percent of component B);
  the molar ratio of component D) relative to component C) is in the range of about 0.95:1 to about 1.05:1.

AS). A process as in any of AA)-AE) wherein the amount of component C) introduced into the reactor is in the range of about 1 to about 0.75 mole percent of component B).

AT). A process as in any of AA)-AE) wherein the amount of component D) introduced into the reactor is in the range of about 1 to about 0.75 mole percent of component B).

AU). A process as in any of AA)-AE) wherein component D) is N,N,N',N'-tetramethylethylenediamine AV). A process as in any of AB)-AE) wherein each R is a hydrogen atom.

AW). A process as in AA) or AB) wherein component A) is toluene, component B) is styrene, and said product further comprises at least 1,3-diphenylpropane, and wherein 1,3-diphenylpropane is recovered from said reaction product.

AX). A process as in AW) which has at least one of the following features:
- said reaction product still further comprises at least 1,3,5-triphenylpentane, and wherein at least 1,3,5-triphenylpentane is recovered from said reaction product;
- said reaction product still further comprises at least 1,3,5,7-tetraphenylheptane, and wherein at least 1,3,5,7-tetraphenylheptane is recovered from said reaction product;
- said reaction product still further comprises at least 1,3,5,7,9-pentaphenylnonane, and wherein at least 1,3,5,7,9-pentaphenylnonane is recovered from said reaction product.

AY). A process as in any of AA)-AH), AJ)-AK), AM)-AT), or AV)-AX) wherein component C) is an alkyllithium compound, and wherein component D) is N,N,N',N'-tetramethylethylenediamine.

Compositions of this invention include:

BA). A composition which comprises
a) an adduct or a mixture of adducts represented by the formula:

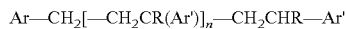

wherein Ar is an aromatic hydrocarbon moiety which has only one methyl group and wherein at least one position on the aromatic ring bearing the methyl group is unsubstituted; Ar' is, independently, an aromatic hydrocarbon moiety; wherein R is a hydrogen atom or a methyl group, and n is a whole number in the range of 0 to 6;

b) a mixture comprising two or more adducts and one or more oligomers, which individual adducts and oligomer(s) of these mixtures can be represented by the formula:

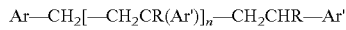

wherein Ar, independently each Ar', and independently each R, is as defined in a), and n is a whole number in the range of 0 to 24; or c) a mixture comprising adducts, oligomers, and low molecular weight polymers, which individual adducts, oligomers, and low molecular weight polymers of these mixtures can be represented by the formula:

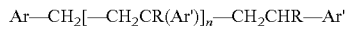

wherein Ar, independently each Ar', and independently each R is as defined in a), and n is a whole number in the range of 0 to 79.

BB). A composition as in BA) wherein Ar contains in the range of 1 to 4 aromatic rings and has in the range of 1 to 6 alkyl ring substituents.

BC). A composition as in BA) or BB) wherein Ar' contains in the range of 1 to 4 aromatic rings.

BD). A composition as in BA) wherein said composition is an adduct or a mixture of adducts.

BE). A composition as in BA) wherein said composition is an adduct, which adduct is 1-phenyl-3-(o-tolyl)propane, 1-phenyl-3-(m-tolyl)propane, 1-phenyl-3-(m-tolyl)-propane, 1-phenyl-3-(p-tert-butylphenyl)propane, 1-phenyl-3-(p-ethylphenyl)propane, 1-(o-isopropylphenyl)-3-(p-tolyl)propane, 1-phenyl-3-(2,4,6-trimethylphenyl)propane, 1-phenyl-3-(1-napthyl)propane, 1-phenyl-3-(2-napthyl)propane, or 1,3,5,7,9-pentaphenyl-nonane.

BF). A composition as in BA) wherein said composition is a mixture of adducts in which the values of n in the individual adduct formulas are consecutive numbers.

BG). A composition as in BA) wherein said composition is a mixture comprising two or more adducts and one or more oligomers.

BH). A composition as in BG) wherein n is in the range of about 1 to about 20.

BI). A composition as in BG) wherein n is in the range of about 1 to about 9.

BJ). A composition as in BA) wherein said composition is a mixture comprising adducts, oligomers, and low molecular weight polymers.

BK). A composition as in any of BA)-BJ) wherein said aromatic moiety contains in the range of 1 to 4 aromatic rings.

BL). A composition as in any of BA)-BJ) wherein said aromatic moiety contains only one aromatic ring.

BM). A composition as in any of BA)-BJ) wherein R is a methyl group.

BN). A composition as in any of BA)-BJ) wherein R is a hydrogen atom.

BO). A composition as in any of BG)-BI) wherein said composition has a polydispersity in the range of about 1.1 to about 3.0, a standard deviation in the range of about 60 to about 1600 Daltons, and an asymmetry in the range of about −4.5 to about 4.5.

BP). A composition as in BJ) wherein said composition has a polydispersity in the range of about 1.2 to about 3.0, a standard deviation of about 160 to about 2100 Daltons, and an asymmetry of about −4.5 to about 4.5.

BQ). A composition as in BG) wherein at least 35 weight percent of said mixture is composed of components in which n is in the range of 1 to about 5.

BR). A composition as in BG) wherein at least 20 weight percent of said mixture is composed of components in which n is in the range of 1 to about 3.

BS). A composition as in BG) wherein at least about 0.005 wt % to less than about 5 wt % of the composition is comprised of moieties represented by the formulae:

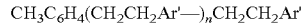

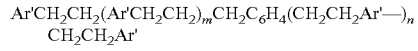

wherein Ar' is, independently, an aromatic hydrocarbon moiety; n is a whole number; m is a whole or fractional number; and the sum of m and n is equal to or less than about 24.

BT). A composition as in BD) wherein said mixture comprises
- 1,3-diphenylpropane, and at least about 0.005 wt % to about 5 wt % of said mixture comprises 2-(2-phenylethyl)toluene, 3-(2-phenylethyl)toluene, and 4-(2-phenylethyl)toluene;
- 1,3,5-triphenylpentane, and at least about 0.005 wt % to about 5 wt % of said mixture comprises 1-tolyl-2,4-diphenylbutane;
- 1,3,5,7-tetraphenylheptane, and at least about 0.005 wt % to about 5 wt % of said mixture comprises 1-tolyl-2,4,6-triphenylhexane; or
- 1,3,5,7,9-pentaphenylnonane, and at least about 0.005 wt % to about 5 wt % of said mixture comprises 1-tolyl-2,4,6,8-tetraphenyloctane.

BU). A composition as in BD) wherein said mixture comprises at least one of the following compounds:
1-phenyl-3-(o-tolyl)propane;
1-phenyl-3-(m-tolyl)propane;
1-phenyl-3-(p-tolyl)propane;
1-phenyl-3-(p-tert-butylphenyl)propane;
1-phenyl-3-(p-ethylphenyl)propane;
1-(o-isopropylphenyl)-3-(p-tolyl)propane;
1-phenyl-3-(2,4,6-trimethylphenyl)propane;
1-phenyl-3-(1-napthyl)propane; or
1-phenyl-3-(2-napthyl)propane,
and wherein at least about 0.005 wt % of said mixture comprises at least one structural isomer of said compound.
BV). A composition as in BU) wherein at least about 0.005 wt % to about 5 wt % of said mixture comprises at least one structural isomer of said compound.

TABLE 1

TABLE 1-continued

The oligomers and the adducts, whether separated from each other such as by distillation or kept in admixture, are particularly useful as raw materials for bromination and consequent production of flame retardant additives and flame retarded polymer and resin compositions. When the adducts and oligomers are separated from each other, the adduct(s) and the oligomers can then be separately subjected to bromination to prepare effective flame retardant compounds for use in polymers, resins, and coatings.

The bromination conditions for effecting bromination on aromatic rings can then be used to form such useful brominated flame retardant products. Thus, the reaction is typically conducted in the dark (i.e., in the total absence of light) to favor aromatic bromination. In addition, the bromination reaction is often conducted in the presence of a liquid halogenated solvent, non-limiting examples of which include bromochloromethane, dibromomethane, 1,2-dibromoethane, 1,1-dibromoethane, and 1,2-dichloroethane.

The brominating agent is usually bromine ($Br_2$) or bromine chloride (BrCl). Preferably, the bromination is conducted using bromine in the liquid state. The amount of brominating agent used should be sufficient to produce a brominated oligomer product having a bromine content of about 45 weight percent or more, i.e., the brominated oligomer product should contain at least about 45 wt % of bromine. Preferred flame retardant oligomers typically contain in the range of about 45 to about 65 wt % of bromine and more preferably in the range of about 55 to about 60 wt % of bromine. The bromine contents of the brominated adducts are typically in the range of about 35 wt % to about 72 wt % and preferably in the range of about 45 wt % to about 68 wt %.

The bromination is typically conducted in the presence of a Lewis acid bromination catalyst. Non-limiting examples of effective Lewis acid bromination catalysts include aluminum halides, such as for example, $AlCl_3$, $AlBr_3$, $AlBr_2Cl$, or $AlCl_2Br$; or ferric halides, such as for example, $FeCl_3$ or $FeBr_3$. Alternatively, the bromination reactor can be charged with aluminum metal in the form of foil, powder, turnings, flakes, filings, or the like. Similarly, when an iron-derived catalyst is to be used, the reactor can be charged with iron filings, iron turnings, or the like. The aluminum metal or iron metal is converted in the presence of the bromine to aluminum bromide species or ferric bromide species.

Bromination is typically performed at one or more temperatures in the range of about 20° C. to about 70° C. For continuous or semi-continuous bromination using aluminum halide catalysis, one or more temperatures in the range of about −10° C. to about 20° C. are preferred. For processes in which perbromination is desired, involving a bromination technique commonly referred to as a "sea-of-bromine", preferred temperatures are in the range of about 55° C. to about 65° C.; a reflux temperature of about 60° C. at about one atmosphere is more convenient.

In conducting the bromination, the brominating agent, preferably bromine, can be introduced portionwise into a mixture of the oligomer and/or adduct, bromination catalyst, and a suitable inert solvent. Other methods of bringing together the brominating agent and the oligomer include feeding the oligomer and/or adduct portionwise, with or without a suitable solvent or diluent, into a reaction zone containing excess liquid bromine and bromination catalyst. To minimize bromination on the aliphatic carbon atoms of the oligomer, it is desirable to conduct the bromination with short reaction times. The longer the brominating agent and oligomer remain in contact, the greater the possibility for aliphatic bromination to occur. Thus, the bromination reaction periods are typically kept below about eighty minutes and preferably are within the range of about two to about twenty minutes.

Upon completion of the bromination, the crude oligomer and/or adduct is treated with water or an aqueous solution of base (e.g., sodium hydroxide, potassium hydroxide, sodium carbonate, or etc.) and when base is used the treatment is followed by water washing. Then, the product is distilled in order to remove the solvent. Use of low boiling solvents is desirable as this enables the crude oligomer to be treated by introducing the crude brominated oligomer into hot water so that the solvent distills off. Thereafter, a phase separation yields the desired product, which can be dried, if desired. Work-up procedures such as described in this paragraph have the additional advantage of removing impurities including low boiling brominated impurities that may be present in the brominated oligomer.

Further details concerning the bromination are set forth below in Examples BR-1 to BR-4 wherein the bromination is conducted on a continuous basis.

In addition, the brominated adduct(s), brominated oligomers, and/or brominated low molecular weight polymers made from the adduct(s), oligomers, and/or low molecular weight polymers producible by this invention are deemed useful as flame retardants in other polymers such as polymers formed by polymerization or copolymerization of monomers having a terminal double bond. There are three groups of such polymers, namely (i) one or more vinylaromatic homopolymers or copolymers, such as polystyrene and impact modified polystyrenes such as HIPS, preferably high-impact polystyrene, (ii) one or more acyclic olefinic hydrocarbon homopolymers or copolymers, such as polyethylene, polypropylene, and copolymers of ethylene or propylene with at least one higher olefin and with or without a diene monomer, and (iii) one or more copolymers of at least one vinylaromatic monomer and at least one non-vinylaromatic monomer containing a functional group, such as acrylonitrile, an acrylate monomer, or a methacrylate monomer with or without a diene monomer. Examples of group (iii) include ABS, MBS, SAN, and ASA. Decabromo-1,3-diphenylpropane formed by brominating 1,3-diphenylpropane is deemed to be an effective flame retardant for use in polymers formed by polymerization or copolymerization of monomers having a terminal double bond.

The flame retarded polymers produced using the above brominated flame retardants can contain other components such as flame retardant aids often referred to as "synergists" such as antimony trioxide, sodium antimonate, or sodium borate; other flame retardants, especially liquid alkylated triphenylphosphates such as isopropylated triphenylphosphate; and components used to improve other properties of the polymer such as antioxidants, metal deactivators, UV stabilizers, pigments and dyes, processing aids, fillers, acid scavengers, thermal stabilizers, blowing agents, lubricants, nucleating agents, anti-static agents, plasticizers, impact modifiers, and other such materials.

The following Examples are presented for purposes of illustration and are not intended to limit this invention to only the subject matter disclosed therein.

Adduct formation begins to compete with oligomerization and polymerization above about 90° C., and is adduct formation is favored over oligomerization and polymerization when the reaction temperature is greater than about 100° C. except when styrene is fed at a very high rate. Several embodiments of this invention leading to formation of mixtures of adducts and mixtures of adducts and oligomers are presented in Table 2 below. All Examples were conducted at one (1.0) atmosphere pressure and 110° C., just below the reflux temperature of the chain transfer agent toluene. Three reaction parameters were varied: (1) total monomer (e.g., styrene) fed relative to total chain transfer agent (CTA, toluene) charged (styrene/toluene); (2) total styrene fed relative to total initiator (butyl lithium TMEDA complex) charged (styrene/toluene); and (3) the rate at which the monomer was fed.

Example 1 sets forth the general procedure which was used in each of Examples 1-11.

EXAMPLE 1

A dry 500-ml 4-necked, oil-jacketed glass flask was equipped with a thermocouple, glass overhead stirrer with glass paddle, condenser and $N_2$ inlet. The reactor was charged with 150 mL (130.5 g, 1.55 mol) anhydrous toluene and then subsequently with 2.7 mL (0.0054 mol) n-butyllithium (2M in cyclohexane) and 0.72 mL (0.56 g, 0.0048 mole) tetramethylethylenediamine (TMEDA) at ambient temperature. The temperature of the reaction mixture was increased to 110° C. Styrene (50 mL, 45 g, 0.43 mol) was pumped into the reactor at over 137 minutes at a constant rate while maintaining constant and significant agitation of the mixture. Upon completion of the styrene feed, 20 mL anhydrous toluene was pumped into the reaction mixture to clear the feed line of styrene. The reaction mixture was then cooled to 80° C. and then quenched with 0.5 mL isopropyl alcohol. After cooling to room temperature and settling of the lithium isopropoxide salts, the reactor was sampled for GPC analysis. The GPC area % analysis excluding unreacted toluene was as follows: $C_{12}H_{16}$ 64.3%; $C_{23}H_{24}$ 23.4%; $C_{31}H_{32}$ 8.2%; $C_{39}H_{40}$ 2.9%; $C_{47}H_{48}$ 0.9%; $C_{55}H_{56}$ 0.3%; $C_{63}H_{64}$ 0%; $C_{71}H_{72}$ 0%; $C_{79}H_{80}$ 0%; $C_{87}H_{88}$ and higher oligomers 0%.

EXAMPLE 2

The procedure as in Example 1 was used except that 45 g (0.43 mole) of styrene was fed over 56 minute period to a reaction mass formed from 130.5 g (1.55 mole) anhydrous toluene, 2.7 mL (0.0054 mole) 2 M n-butyl lithium and 0.56 g (0.0048 mole) of TMEDA. The GPC area % analysis excluding unreacted toluene was as follows: $C_{15}H_{16}$ 32.9%; $C_{23}H_{24}$ 22.5%; $C_{31}H_{32}$ 14.7%; $C_{39}H_{40}$ 9.9%; $C_{47}H_{48}$ 6.5%; $C_{55}H_{56}$ 4.3%; $C_{63}H_{64}$ 3.0%; $C_{71}H_{72}$ 6.2%; $C_{79}H_{80}$ 0%; $C_{87}H_{88}$ and higher oligomers 0%.

EXAMPLE 3

The procedure as in Example 1 was used except that 45 g (0.43 mole) of styrene was fed over 46 minute period to a reaction mass formed from 130.5 g (1.55 mole) anhydrous toluene, 2.7 mL (0.0054 mole) 2 M n-butyl lithium and 0.56 g (0.0048 mole) of TMEDA. The GPC area % analysis, excluding unreacted toluene, was as follows: $C_{15}H_{16}$ 15.23%; $C_{23}H_{24}$ 14.6%: $C_{31}H_{32}$ 12.18%; $C_{39}H_{40}$ 10.87%; $C_{47}H_{48}$ 8.83%; $C_{55}H_{56}$ 7.63%: $C_{63}H_{64}$ 5.93%; $C_{71}H_{72}$ 4.85%; $C_{79}H_{80}$ 4.26%; $C_{87}H_{88}$ and higher oligomers 15.62%.

EXAMPLE 4

The procedure of Example 1 was used except that 45 g (0.43 mole) of styrene was fed over 25 minute period to a reaction mass formed from 130.5 g (1.55 mole) anhydrous toluene, 2.7 mL (0.0054 mole) 2 M n-butyl lithium and 0.56 g (0.0048 mole) of TMEDA. The GPC area % analysis excluding unreacted toluene was as follows: $C_{15}H_{16}$ 8.8%; $C_{23}H_{24}$ 8.4%; $C_{31}H_{32}$ 8.3%; $C_{39}H_{40}$ 7.8%; $C_{47}H_{48}$ 6.8%; $C_{55}H_{56}$ 6.1%; $C_{63}H_{64}$ 6.3%; $C_{71}H_{72}$ 5.1%; $C_{79}H_{80}$ 5%; $C_{87}H_{88}$ and higher oligomers 37.5%.

EXAMPLE 5

The procedure of Example 1 was used except that 45 g (0.43 mole) of styrene was fed over 127 minute period to a reaction mass formed from 130.5 g (1.55 mole) anhydrous toluene, 1.8 mL (0.0036 mole) 2 M n-butyl lithium and 0.42 g (0.0036 mole) of TMEDA. The GPC area % analysis excluding unreacted toluene was as follows: $C_{15}H_{16}$ 46.1; $C_{23}H_{24}$ 25.5%; $C_{31}H_{32}$ 13.6%; $C_{39}H_{40}$ 7.2%; $C_{47}H_{48}$ 3.8%; $C_{55}H_{56}$ 1.7%; $C_{63}H_{64}$ and higher oligomers 2%.

EXAMPLE 6

The procedure of Example 1 was used except that 45 g (0.43 mole) of styrene was fed over 79 minute period to a reaction mass formed from 130.5 g (1.55 mole) anhydrous toluene, 1.8 mL (0.0036 mole) 2 M n-butyl lithium and 0.42 g (0.0036 mole) of TMEDA. The GPC area % analysis excluding unreacted toluene was as follows: $C_{15}H_{16}$ 25.1%; $C_{23}H_{24}$ 20.4%; $C_{31}H_{32}$ 15.5%; $C_{39}H_{40}$ 11.5%; $C_{47}H_{48}$ 8.4%; $C_{55}H_{56}$ 5.8%; $C_{63}H_{64}$ 4.4%; $C_{71}H_{72}$ 2.8%; $C_{79}H_{80}$ and higher oligomers 6.1%.

EXAMPLE 7

The procedure of Example 1 was used except that 45 g (0.43 mole) of styrene was fed over 64 minute period to a reaction mass formed from 130.5 g (1.55 mole) anhydrous toluene, 1.8 mL (0.0036 mole) 2 M n-butyl lithium and 0.42 g (0.0036 mole) of TMEDA. The GPC area % analysis excluding unreacted toluene was as follows: $C_{15}H_{16}$ 15.5%; $C_{23}H_{24}$ 14.2%; $C_{31}H_{32}$ 12.6%; $C_{39}H_{40}$ 11.1%; $C_{47}H_{48}$ 9.5%; $C_{55}H_{56}$ 7.7%; $C_{63}H_{64}$ 6.5%; $C_{71}H_{72}$ 5.3%; $C_{79}H_{80}$ 4.1%; $C_{87}H_{88}$ and higher oligomers 13.5%.

EXAMPLE 8

The procedure of Example 1 was used except that 45 g (0.43 mole) of styrene was fed over 134 minute period to a reaction mass formed from 130.5 g (1.55 mole) anhydrous toluene, 1.35 mL (0.0027 mole) 2 M n-butyl lithium and 0.31 g (0.0027 mole) of TMEDA. The GPC area % analysis excluding unreacted toluene was as follows: $C_{15}H_{16}$ 23.5%; $C_{23}H_{24}$ 20.0%; $C_{31}H_{32}$ 15.4%; $C_{39}H_{40}$ 12.1%; $C_{47}H_{48}$ 8.8%; $C_{55}H_{56}$ 6.1%; $C_{63}H_{64}$ 4.6%; $C_{71}H_{72}$ 2.8%; $C_{79}H_{80}$ and higher oligomers 6.7%.

EXAMPLE 9

The procedure of Example 1 was used except that 45 g (0.43 mole) of styrene was fed over 97 minute period to a reaction mass formed from 130.5 g (1.55 mole) anhydrous toluene, 1.35 mL (0.0027 mole) 2 M n-butyl lithium and 0.31 g (0.0027 mole) of TMEDA. The GPC area % analysis excluding unreacted toluene was as follows: $C_{15}H_{16}$ 16.3%; $C_{23}H_{24}$ 16.2%; $C_{31}H_{32}$ 13.8%; $C_{39}H_{40}$ 11.7%; $C_{47}H_{48}$ 9.4%; $C_{55}H_{56}$ 7.4%; $C_{63}H_{64}$ 6.0%; $C_{71}H_{72}$ 5.10%; $C_{79}H_{80}$ 3.6%; $C_{87}H_{88}$ and higher oligomers 10.5%.

EXAMPLE 10

The procedure of Example 1 was used except that 60.9 g (0.58 mole) of styrene was fed over 173 minute period to a reaction mass formed from 115.0 g (1.25 mole) anhydrous toluene, 2.4 mL (0.00487 mole) 2 M n-butyl lithium and 0.57 g (0.00487 mole) of TMEDA. The GPC area % analysis excluding unreacted toluene was as follows: $C_{15}H_{16}$ 64.8%; $C_{23}H_{24}$ 22.3%; $C_{31}H_{32}$ 7.6%; $C_{39}H_{40}$ 3.0%; $C_{47}H_{48}$ 1.9%.

EXAMPLE 11

The procedure of Example 1 was used except that 60.9 g (0.58 mole) of styrene was fed over 120 minute period to a reaction mass formed from 115.0 g (1.25 mole) anhydrous toluene, 2.4 mL (0.00487 mole) 2 M n-butyl lithium and 0.57 g (0.00487 mole) of TMEDA. The GPC area % analysis excluding unreacted toluene was as follows: $C_{15}H_{16}$ 37.7%; $C_{23}H_{24}$ 18.2%; $C_{31}H_{32}$ 13.8%; $C_{39}H_{40}$ 9.6%; $C_{47}H_{48}$ 6.5%; $C_{55}H_{56}$ 4.4%: $C_{63}H_{64}$ 2.9%; $C_{71}H_{72}$ 2.1%; $C_{79}H_{80}$ 1.5%; $C_{87}H_{88}$ and higher oligomers 3.3%.

The product mixtures were analyzed by GPC using an oligopore column which provided baseline to baseline resolution of adducts as well as partially resolved the shortest chain oligomers. It is therefore possible to discuss these product mixtures in terms of the relative formation of discrete molecules. Still we applied the same statistical treatment of the GPC curves for comparison to later tables. Comparing Examples 1 and 3 (see Table 2, below) shows that relatively similar product distributions can be obtained by independently modifying the three variables cited above while holding temperature constant. The resulting data demonstrates that a variety of mixtures of adducts and mixtures of adducts and oligomers can be prepared under different process conditions. The product distributions demonstrate a dependence on the ratio of monomer to chain transfer agent, on the ratio of monomer to the tertiary polyamine complex organolithium initiator, and on the feed rate of the monomer.

Table 2 summarizes the conditions and results for Examples 1-11.

TABLE 2

Adducts and Adducts + Oligomers Formation at 110° C.

| | | | Example | | | | | | |
|---|---|---|---|---|---|---|---|---|---|
| | | | 1 | 2 | 3 | 4 | 5 | 6 | 7 |
| Styrene/Toluene (vol/vol) | | | 0.33 | 0.33 | 0.33 | 0.33 | 0.33 | 0.33 | 0.33 |
| Styrene/butyllithium-TMEDA | | | 80 | 80 | 80 | 80 | 120 | 120 | 120 |
| Time of Styrene Feed | | | 137 min | 56 min | 46 min | 25 min | 127 min | 79 min | 64 min |
| Adducts/Oligomers | | | | | | | | | |
| n = | MW | Formula | Relative Area % | | | | Relative Area % | | |
| 0 | 196.29 | $C_{15}H_{16}$ | 64.3 | 32.9 | 15.23 | 8.8 | 46.1 | 25.1 | 15.5 |
| 1 | 300.44 | $C_{23}H_{24}$ | 23.4 | 22.5 | 14.6 | 8.4 | 25.5 | 20.4 | 14.2 |
| 2 | 404.59 | $C_{31}H_{32}$ | 8.2 | 14.7 | 12.18 | 8.3 | 13.6 | 15.5 | 12.6 |
| 3 | 508.74 | $C_{39}H_{40}$ | 2.9 | 9.9 | 10.87 | 7.8 | 7.2 | 11.5 | 11.1 |
| 4 | 612.89 | $C_{47}H_{48}$ | 0.9 | 6.5 | 8.83 | 6.8 | 3.8 | 8.4 | 9.5 |
| 5 | 717.04 | $C_{55}H_{56}$ | 0.3 | 4.3 | 7.63 | 6.1 | 1.7 | 5.8 | 7.7 |
| 6 | 821.19 | $C_{63}H_{64}$ | | 3 | 5.93 | 6.3 | 2 | 4.4 | 6.5 |
| 7 | 925.34 | $C_{71}H_{72}$ | | 6.2 | 4.85 | 5.1 | | 2.8 | 5.3 |
| 8 | 1029.49 | $C_{79}H_{80}$ | | | 4.26 | 5 | | 6.1 | 4.1 |
| 9+ | 1133.64 | $C_{87}H_{88}$ | | | 15.62 | 37.5 | | | 13.5 |
| | $M_p$ | | 196 | 196 | 196 | 300 | 196 | 198 | 195 |
| | $M_n$ | | 232 | 309 | 431 | 589 | 265 | 346 | 429 |
| | $M_w$ | | 254 | 407 | 647 | 966 | 313 | 468 | 641 |
| | $M_z$ | | 288 | 565 | 941 | 1373 | 388 | 649 | 930 |
| | PD | | 1.09 | 1.32 | 1.50 | 1.64 | 1.18 | 1.35 | 1.49 |
| | $S_n$ | | 71 | 174 | 305 | 471 | 113 | 205 | 302 |
| | Variance ($M_wM_n-M_n^2$) | | 5.104E+03 | 3.028E+04 | 9.310E+04 | 2.221E+05 | 1.272E+04 | 4.221E+04 | 9.095E+04 |
| | Skewness $_nU_3$ | | 9.317E+05 | 1.348E+07 | 6.197E+07 | 1.845E+08 | 3.461E+06 | 1.985E+07 | 5.974E+07 |
| | $_n\alpha_3$ | | 2.555 | 2.558 | 2.182 | 1.763 | 2.412 | 2.289 | 2.178 |

| | | | Example | | | |
|---|---|---|---|---|---|---|
| | | | 8 | 9 | 10 | 11 |
| Styrene/Toluene (vol/vol) | | | 0.33 | 0.33 | 0.5 | 0.5 |
| Styrene/butyllithium-TMEDA | | | 160 | 160 | 120 | 120 |
| Time of Styrene Feed | | | 134 min | 97 min | 173 min | 108 min |
| Adducts/Oligomers | | | | | | |
| n = | MW | Formula | Relative Area % | | Relative Area % | |
| 0 | 196.29 | $C_{15}H_{16}$ | 23.5 | 16.3 | 64.8 | 37.7 |
| 1 | 300.44 | $C_{23}H_{24}$ | 20 | 16.2 | 22.3 | 18.2 |
| 2 | 404.59 | $C_{31}H_{32}$ | 15.4 | 13.8 | 7.6 | 13.8 |
| 3 | 508.74 | $C_{39}H_{40}$ | 12.1 | 11.7 | 3 | 9.6 |
| 4 | 612.89 | $C_{47}H_{48}$ | 8.8 | 9.4 | 1.9 | 6.5 |
| 5 | 717.04 | $C_{55}H_{56}$ | 6.1 | 7.4 | | 4.4 |
| 6 | 821.19 | $C_{63}H_{64}$ | 4.6 | 6 | | 2.9 |

TABLE 2-continued

Adducts and Adducts + Oligomers Formation at 110° C.

| | | | | | | |
|---|---|---|---|---|---|---|
| 7 | 925.34 | $C_{71}H_{72}$ | 2.8 | 5 | | 2.1 |
| 8 | 1029.49 | $C_{79}H_{80}$ | 6.7 | 3.6 | | 1.5 |
| 9+ | 1133.64 | $C_{87}H_{88}$ | | 10.5 | | 3.3 |
| | | $M_p$ | 196 | 301 | 196 | 196 |
| | | $M_n$ | 353 | 413 | 230 | 319 |
| | | $M_w$ | 493 | 591 | 251 | 420 |
| | | $M_z$ | 727 | 830 | 285 | 577 |
| | | PD | 1.4 | 1.43 | 1.09 | 1.32 |
| | | $S_n$ | 222 | 271 | 69 | 179 |
| | Variance $(M_wM_n - M_n^2)$ | | 4.942E+04 | 7.351E+04 | 4.830E+03 | 3.222E+04 |
| | Skewness $_nU_3$ | | 3.020E+07 | 4.106E+07 | 9.534E+05 | 1.401E+07 |
| | | $_n\alpha_3$ | 2.75 | 2.060 | 2.840 | 2.423 |

Examples 12-20 illustrate processes of this invention conducted on a larger scale.

EXAMPLE 12

A dry oil-jacketed reactor equipped with stainless steel internal cooling coils (chilled water) and a glass overhead stirring mechanism (no PTFE wetted parts) was charged with 3.46 kg (41.11 mol) of anhydrous toluene and heated to 80° C. To the mixture is charged butyl lithium (0.36 mol) in cyclohexane followed by 64.13 g (0.55 mol) dry TMEDA. Styrene (3000 g, 28.8 mol) was fed to the reactor (through a plug of anhydrous basic alumina) in 72 minutes at 90-95° C. The reaction mixture was quenched with 100 mL of water and subsequently washed three times with 1.0 kg of tap water. Toluene was distilled from the crude adducts. The crude material was then distilled at full vacuum to yield 2.0 kg of 1,3-diphenylpropane, 900 g of 1,3,5-triphenylpentane, 550 g of 1,3,5,7-tetraphenylheptane and 150 grams of 1,3,5,7,9-pentaphenylnonane.

EXAMPLE 13

A dry oil-jacketed reactor equipped with stainless steel internal cooling coils (chilled water) and a glass overhead stiffing mechanism (no PTFE wetted parts) was charged with 4.325 kg (51.39 mol) of anhydrous toluene and heated to 80° C. To the mixture is charged butyl lithium (0.18 mol) in cyclohexane followed by 33.47 g (0.29 mol) dry TMEDA. Styrene (1.5 g, 14.4 mol) was fed to the reactor (through a plug of anhydrous basic alumina) in 150 minutes at 90-95° C. The reaction mixture was quenched with 100 mL of water and subsequently washed three times with 0.5 kg of tap water. Toluene was distilled from the crude oligomers. The crude material was then distilled at full vacuum to yield 2.0 kg of 1,3-diphenylpropane, 300 g of 1,3,5-triphenylpentane, 120 g of 1,3,5,7-tetraphenylheptane and 8 grams of undistillable oligomer bottoms.

EXAMPLE 14

A dry oil-jacketed reactor equipped with stainless steel internal cooling coils (chilled water) and a glass overhead stirring mechanism (no PTFE wetted parts) was charged with 1.73 kg (20.56 mol) of anhydrous toluene and heated to 80° C. To the mixture is charged butyl lithium (0.1 mol) in cyclohexane followed by 16.74 g (0.14 mol) dry TMEDA. Styrene (1500 g, 14.4 mol) was fed to the reactor (through a plug of anhydrous basic alumina) in 15 minutes at 95-115° C. All but 500 g of the reaction mixture was quenched with 100 mL of water and subsequently washed three times with 1.0 kg of tap water. Toluene was distilled from the crude oligomers. The crude material was analyzed by GPC and found to have $M_w=1184$, $M_p=1137$, $M_n=729$ Daltons relative to well-characterized anionic polystyrene standards. Polydispersity=1.75.

EXAMPLE 15

A dry oil-jacketed reactor equipped with stainless steel internal coiling coils (chilled water) and a glass overhead stiffing mechanism (no PTFE wetted parts was charged with a 500 g heel from Example 14. To the heel was added 0.229 kg (2.72 mol) of anhydrous toluene prior heating to 80° C. To the mixture was charged n-butyl lithium (0.045 mol) in cyclohexane followed by 10.46 g (0.09 mol) dry TMEDA. Styrene (1500 g, 14.4 mol) was fed to the reactor (through a plug of anhydrous basic alumina) in 150 minutes at 110-125° C. The reaction mixture was quenched with 100 ml of water and subsequently washed three times with 1.0 kg of tap water. NMR analysis of the quenched mixture showed the presence of a relatively small amount (ca.<2 wt %) unreacted styrene. The unreacted styrene and toluene were distilled from the crude oligomers the resulting material was analyzed by GPC and found to have $M_w=2512$, $M_p=2321$, $M_n=9.62$ Daltons relative to well-characterized anionic polystyrene standards. Polydispersity=2.61.

EXAMPLE 16

A dry oil-jacketed reactor equipped with stainless steel internal coiling coils (chilled water) and a glass overhead stirring mechanism (no PTFE wetted parts) was charged with 0.4 kg (4.76 mol) of anhydrous toluene and heated to 85° C. To the mixture was charged butyl lithium (0.12 mol) in cyclohexane followed by 18.55 g (0.16 mol) dry TMEDA. Styrene (1000 g, 9.6 mol) was fed to the reactor (through a plug of anhydrous basic alumina) in 16 minutes at 85-90° C. The reaction mixture was quenched with 100 mL of water and subsequently washed three times with 0.5 kg of tap water. Toluene was distilled from the crude mixture of oligomers and low molecular weight polymers. The crude material was analyzed by GPC and found to have $M_w=3211$, $M_p=4279$, $M_n=1369$ Daltons relative to well-characterized anionic polystyrene standards. Polydispersity=2.34.

EXAMPLE 17

A dry oil-jacketed reactor equipped with stainless steel internal coiling coils (chilled water) and a glass overhead stirring mechanism (no PTFE wetted parts) was charged with 0.4 kg (4.76 mol) of anhydrous toluene and heated to 80° C.

To the mixture is charged butyl lithium (0.1 mol) in cyclohexane followed by 15.39 g (0.13 mol) dry TMEDA. Styrene (2000 g, 19.2 mol) was combined with 0.3 kg of toluene and then fed to the reactor (through a plug of anhydrous basic alumina) in 82 minutes at 85-105° C. The reaction mixture was quenched with 100 mL of water and subsequently washed three times with 1.0 kg of tap water. Toluene was distilled from the crude oligomers. The crude material was analyzed by GPC and found to have $M_w$=1513, $M_p$=1454, $M_n$=732 Daltons relative to well-characterized anionic polystyrene standards. Polydispersity=2.07.

EXAMPLE 18

A dry oil-jacketed reactor equipped with stainless steel internal coiling coils (chilled water) and a glass overhead stiffing mechanism (no PTFE wetted parts) was charged with 0.364 kg (0.43 mol) of anhydrous toluene along with 0.128 liters of methylcyclohexane and was then heated to 80° C. To the reaction mixture was charged butyl lithium (0.144 mol) in cyclohexane followed by 17.15 g (0.15 mol) dry TMEDA. The mixture was then heated to a gentle reflux. Styrene (1913 g, 18.37 mol) was combined with 0.427 kg (5.08 mol) anhydrous toluene and then fed to the reactor (through a plug of anhydrous basic alumina) in 120 minutes at 116° C.-125° C. The reaction mixture was quenched with 100 mL of water and subsequently washed three times with 1.0 kg of tap water. Unreacted toluene and methylcyclohexane were distilled from the crude oligomers. The crude material was analyzed by GPC and found to have $M_w$=1545, $M_p$=1243, $M_n$=616 Daltons relative to well-characterized anionic polystyrene standards. Polydispersity=2.51.

EXAMPLE 19

A dry oil-jacketed reactor equipped with stainless steel internal coiling coils (chilled water), simple distillation apparatus, and a glass overhead stirring mechanism (no PTFE wetted parts) was charged with 0.182 kg (2.16 mol) of anhydrous toluene along with 0.128 liters of methylcyclohexane and was then heated to 90° C. To the reaction mixture was charged butyl lithium (0.058 mol) in cyclohexane followed by 6.86 g (0.06 mol) dry TMEDA. Styrene (1500 g, 14.4 mol) was combined with 1.0 L of n-pentane and then was fed to the reactor (through a plug of anhydrous basic alumina) in 120 minutes at 90° C.-117° C. During the styrene feed, 0.216 kg (2.56 mol) of toluene was added in five 0.050 L aliquots to control the viscosity of the reaction mixture. The reaction mixture was quenched with 100 mL of water and subsequently washed three times with 1.0 kg of tap water. Unreacted toluene and methylcyclohexane were distilled from the crude oligomers and low molecular weight polymers. The crude material was analyzed by GPC and found to have $M_w$=2114, $M_p$=1570, $M_n$=753 Daltons relative to well-characterized anionic polystyrene standards. Polydispersity=2.81.

EXAMPLE 20

A dry oil-jacketed reactor equipped with stainless steel internal coiling coils (chilled water), and a glass overhead stirring mechanism (no PTFE wetted parts) was charged with 0.242 kg (2.88 mol) of anhydrous toluene and 1000 mL of anhydrous ethylbenzene and heated to 80° C. To the mixture was charged butyl lithium (0.08 mol) in cyclohexane followed by 7.88 g (0.07 mol) dry TMEDA. The mixture was then heated to 114° C. Styrene (1500 g, 14.4 mol) was fed to the reactor (through a plug of anhydrous basic alumina) in 150 minutes at 114-121° C. The reaction mixture was quenched with 100 mL of water and subsequently washed three times with 1.0 kg of tap water. Unreacted toluene and ethylbenzene was distilled from the crude oligomers. The crude material was analyzed by GPC and found to have $M_w$=2127, $M_p$=2101, $M_n$=933 Daltons relative to well-characterized anionic polystyrene standards. Polydispersity=2.28.

In Table 3, experimental results obtained for the preparation of mixtures of adducts and vinylaromatic oligomers, and of adducts, vinylaromatic oligomers, and low molecular weight vinylaromatic polymers from toluene and styrene via chain transfer employing catalytic organolithium complexed with TMEDA at elevated temperatures (greater than 80° C.) are summarized. Of economic significance is the improved butyl lithium utilization (as inferred from the quotient $M_{calc}/M_w$) on the order of 160% (Example 16) to 1200% (Examples 14, 15, and 17), signifying that the processes of this invention are highly efficient. Such improved lithium utilization is the result of the catalytic nature of the invention as compared to standard anionic lithium catalyzed processes in which a minimum of a stoichiometric amount of lithium is used. The PD and $S_n$ for all Examples are small with the maximum PD=2.81, but more typically about 2 with a standard deviation ranging from about 600 to about 1600 Daltons. In addition, the data demonstrates that there is a low degree of asymmetry, with asymmetry values ranging from about 2.35 to about 4.13.

TABLE 3

Examples Which Made Higher Molecular Weight Material

| | Example | | | | | | |
|---|---|---|---|---|---|---|---|
| | 14 | 15 | 16 | 17 | 18 | 19 | 20 |
| Styrene g | 1500.00 | 1500.00 | 1000.00 | 2000.00 | 1913 | 1500 | 1500 |
| Styrene mol | 14.40 | 14.40 | 9.60 | 19.20 | 18.37 | 14.40 | 14.40 |
| Butyl lithium mol | 0.09 | 0.04 | 0.12 | 0.10 | 0.14 | 0.06 | 0.08 |
| Mol Ratio Promoter to Bu—Li | 1.61 | 2.01 | 1.33 | 1.33 | 1.02 | 1.02 | 0.90 |
| TMEDA g | 16.74 | 10.46 | 18.55 | 15.39 | 17.15 | 6.86 | 7.88 |
| TMEDA mol | 0.14 | 0.09 | 0.16 | 0.13 | 0.15 | 0.06 | 0.07 |
| Chain Transfer Agent | Toluene | Toluene | Toluene | Toluene | Toluene | Toluene | Toluene |

TABLE 3-continued

Examples Which Made Higher Molecular Weight Material

| | Example | | | | | | |
|---|---|---|---|---|---|---|---|
| | 14 | 15 | 16 | 17 | 18 | 19 | 20 |
| CTA g | 1730.00 | 229.23 | 400.50 | 700.50 | 463.75 | 182.00 | 242.42 |
| CTA mol | 20.56 | 2.72 | 4.76 | 8.32 | 5.51 | 2.16 | 2.88 |
| Mol Styrene/Mol BuLi | 161 | 322 | 80 | 193 | 127 | 210 | 280 |
| Added Solvent | none | heel from Ex. 14 | none | none | Methyl-cyclohexane | Methyl-cyclohexane | Ethyl-benzene |
| Volume of Solvent | 0.00 | 600.00 | 0.00 | 0.00 | 128 | 50 | 1000 |
| Temp | 95-115° C. | 110-125° C. | 85-90° C. | 85-105° C. | 116-125° C. | 90-117° C. | 114° C. |
| Feed Time | 15 min | 150 min | 16 min | 82 min | 120 min | 180 min | 150 min |
| $M_{calc}$ | 16839 | 33594 | 8416 | 20165 | 13368 | 26114 | 20001 |
| $M_{calc}/M_w$ | 13.18 | 13.37 | 2.62 | 13.33 | 8.05 | 12.35 | 9.40 |
| $M_p$ | 1137 | 2321 | 4279 | 1454 | 1239 | 1570 | 2101 |
| $M_n$ | 729 | 962 | 1369 | 732 | 806 | 753 | 933 |
| $M_w$ | 1278 | 2512 | 3211 | 1513 | 1661 | 2114 | 2127 |
| $M_z$ | 2023 | 4955 | 5082 | 2552 | 3125 | 4415 | 3722 |
| $M_{z+1}$ | 2880 | 8359 | 6755 | 3789 | 5049 | 7059 | 5538 |
| $M_v$ | 1184 | 2237 | 2941 | 1383 | 1495 | 1849 | 1926 |
| PD | 1.75 | 2.61 | 2.35 | 2.07 | 2.06 | 2.81 | 2.28 |
| Variance $(M_w M_n - M_n^2)$ | 4.00E+05 | 1.49E+06 | 2.52E+06 | 5.72E+05 | 6.89E+05 | 1.02E+06 | 1.11E+06 |
| Standard Deviation $S_{n, (M_w M_n - M_n^2)^{1/2}}$ | 632 | 1221 | 1588 | 756 | 830 | 1012 | 1055 |
| Skewness | 6.22E+08 | 6.78E+09 | 9.42E+09 | 1.18E+09 | 1.99E+09 | 4.29E+09 | 3.46E+09 |
| Asymmetry $_n\alpha_3$ | 2.46 | 3.72 | 2.35 | 2.73 | 3.49 | 4.13 | 2.94 |

Examples 21-23 are continuous runs with back-mixing.

EXAMPLE 21

The apparatus was a glass 200 mL oil-jacketed baffled cylindrical reactor with an overflow port equipped with a nitrogen inlet, overhead stainless steel stirring shaft with pitched blade turbine impeller, and a thermal couple. The reactor was also outfitted with two subsurface feed lines: (1) a stainless steel 1/8$^{th}$ inch OD line for introducing a mixture of styrene and toluene; and (2) a stainless steel 1/16$^{th}$ inch OD line for feeding a mixture formed from butyl lithium TMEDA and toluene. The 1/16$^{th}$ inch line was threaded through a 1/4 inch line to prevent entanglement with the mechanical stirring apparatus during the course of a run. The tip of the 1/16$^{th}$ inch feed line was directed just below the impeller. The overflow port was directed downward at a 22.5° angle, and was attached by means of a 13 mm Ace Thread® Teflon® connection to a 24-inch long glycol jacketed 15 mm OD glass tube. The other end of the 15 mm glass tube was connected to a 2 liter, glycol-jacketed stirred reactor by means of a second 13 mm Ace Thread® Teflon® connection (neither Teflon® couplings were wetted parts). The overflow reactor was equipped with an all-glass overhead stirring apparatus, bottom drain valve, chilled water condenser, and nitrogen oil-bubbler outlet. The overflow line and reactor were heated to 100° C. with glycol.

In a stirred, oven-dried pear-shaped 500 ml flask under an inert $N_2$ atmosphere at ambient temperature, an organolithium mixture was formed from 91.75 g (106 mL, 1.09 mol) of anhydrous toluene, 42.98 mL of 16.5 wt % (5.28 g, 0.0824 mol contained alkyl lithium) n-butyl lithium in cyclohexane and 8.62 g (11.19 mL, 0.0742 mole) TMEDA; this mixture was stirred with a glass coated (no PTFE) magnetic stirring bar. About one half of the solution was drawn through a 1/16$^{th}$ inch stainless steel three-way ball valve into an oven dried 100 ml glass syringe mounted on a syringe pump. After infusion of the syringe, the ball valve was lined up such that the path from the syringe to the 16$^{th}$ inch subsurface feed line in the reactor was open and the path to the magnetically stirred flask was closed. During the course of a reaction, the infusion of the syringe with the second half of the mixture was achieved by lining the 3-way ball valve such that the path to the flask is open and the path to the reactor was closed.

At the start of the run, the reactor was charged with 100 mL of anhydrous toluene and heated to 110° C. Meanwhile, 547 g (602 mL, 5.25 mol) of styrene and 1734 g (2000 mL, 20.6 mol) of anhydrous toluene were combined, mixed and then charged to a $N_2$-blanketed 3000 ml graduated cylinder reservoir. The toluene-styrene mixture was pumped to the reactor with a laboratory-metering pump through a column of anhydrous basic alumina until the first drop or two were seen entering the reactor; the feed was stopped and stirring in the reactor was initiated (~400 rpm). Butyl lithium in cyclohexane was charged dropwise into the reactor by means of a 1.0 mL syringe. The addition was stopped when the characteristic red color of the polystyryllithium anion appeared (indicating anhydrous conditions). Next, about 4.8 g (0.012 mol) of 16.5 wt % n-butyl lithium and 1.3 g (0.011 mol) of TMEDA were charged to the reactor. The feed rates of both feeds (toluene-styrene mixture and organolithium mixture) were preset (toluene-styrene mixture: 6.28 mL/min; organolithium mixture: 0.386 mL/min) and the pumps were calibrated such that 200 ml of combined feed passed through the reactor per hour (two reactor volumes per hour) for a 30-minute residence time. The process was conducted for about 195 minutes at 110° C.

Samples were collected approximately every 30 minutes after the first 45-minute period. It was found that within two reactor volumes, the system had reached steady state conditions. The GPC molecular weight distribution of the first fraction collected was as follows: $M_w$=1992, $M_p$=2209, $M_n$=716 Daltons, $M_p$=3512 and Polydispersity=2.78. A typical steady state fraction analyzed as follows: $M_w$=4146, $M_p$=4507, $M_n$=1656, $M_p$=7134 Daltons and Polydispersity=2.50. GPC analysis of a composite of steady state fractions analyzed after stripping toluene and 1-3-diphenylpropane was as follows: $M_w$=4051, $M_p$=3822, $M_n$=1879, $M_z$=6897 Daltons and Polydispersity=2.15.

EXAMPLE 22

The run in this Example repeats that of Example 21, except as described herein. The toluene-styrene mixture was made from 547 g (602 mL, 5.25 mol) of styrene and 1730 g (2000 mL, 20.56 mol) anhydrous toluene. The organolithium mixture was formed from 111.44 g (1.32 mol, 129 mL) of anhydrous toluene, 42.98 mL of 16.5 wt % (5.28 g, 0.0824 mol contained alkyl lithium) n-butyl lithium in cyclohexane and 9.1 g (11.81 mL, 0.0783 mole) TMEDA. After the red color of the polystyryllithium anion appeared, about 6 mL of the organolithium mixture was charged to the reactor. The feed rates of both feeds were preset (toluene-styrene mixture: 6.08 mL/min; organolithium mixture: 0.579 mL/min) and the pumps were calibrated such that 400 ml of combined feed passed through the reactor per hour (two reactor volumes per hour) thus providing a 30-minute residence time. The process was conducted for about 200 minutes at 110° C.-113° C. For the second 200 minutes, the toluene-styrene mixture feed rate was set at 6.31 mL/min and the organolithium mixture feed rate was set at 0.35 mL/min.

The GPC molecular weight distribution of a typical steady state fraction during the first set of feed rates analyzed as follows: $M_w$=1151, $M_p$=1123, $M_n$=592, $M_p$=1861 Daltons and Polydispersity=2.50. GPC analysis of the last fraction analyzed as follows: $M_w$=1984, $M_p$=2025, $M_n$=907, $M_z$=3293 Daltons and Polydispersity=2.19 (a steady state was not achieved before running out of preformed reagents. The molecular weight distribution continued to shift to higher weights. Low polydispersity, modest breadth, and low asymmetry were maintained while the molecular weight distribution shifted to higher values.

EXAMPLE 23

The run in this Example repeats that of Example 21, except as described herein. The toluene-styrene mixture was made from 547 g (602 mL, 5.25 mol) of styrene and 1816 g (2100 mL, 21.58 mol) of anhydrous toluene. The organolithium mixture was formed from 177.27 g (2.11 mol, 205 mL) of anhydrous toluene, 90.26 mL of 16.5 wt % (11.08 g, 0.173 mol contained alkyl lithium) n-butyl lithium in cyclohexane and 24.81 g (19.10 mL, 0.1644 mole) TMEDA. After the red color of the polystyryllithium anion appeared, about 10 g (0.024 mol) of 16.5 wt % n-butyl lithium and 2.6 g (0.022 mol) of TMEDA were charged to the reactor. The feed rates of both feeds were preset (toluene-styrene mixture: 6.28 mL/min; organolithium mixture: 0.764 mL/min). The combined feed rate was one reactor volume (200 ml) per 28.4 minutes. The process was conducted for about 419 minutes at 110° C.-113° C.

Samples were collected approximately every 30 minutes after the first 45 minute period. It was found that within two reactor volumes, the system had reached steady state conditions. The GPC molecular weight distribution of the first fraction collected was as follows: $M_w$=2154, $M_p$=2293, $M_n$=953, $M_z$=3510 Daltons and Polydispersity=1.65. A typical steady state fraction analyzed as follows: $M_w$=2395, $M_p$=2410, $M_n$=1026, $M_p$=4246 Daltons and Polydispersity=2.34. GPC analysis of a composite of steady state fractions analyzed after stripping toluene and 1-3-diphenylpropane was as follows: $M_w$=2288, $M_p$=2094, $M_n$=1200, $M_z$=3767 Daltons and Polydispersity=1.91.

TABLE 4

Product Molecular Weight Distributions for Continuous Oligomerization and Polymerization with Back-mixing Involving Chain Transfer

| | Example | | | | | | | | | |
|---|---|---|---|---|---|---|---|---|---|---|
| | 21 | 21 | 21 | 22 | 22 | 22 | 22 | 23 | 23 | 23 |
| | Fraction | | | | | | | | | |
| | 1 | 7 | Composite | 3 | 5 | 7 | 8 | 2 | 5 | Composite |
| $M_p$ | 2209 | 4507 | 3822 | 1137 | 1123 | 1705 | 2025 | 2293 | 2410 | 2094 |
| $M_n$ | 716 | 1647 | 1879 | 589 | 592 | 814 | 907 | 953 | 1026 | 1200 |
| $M_w$ | 1992 | 4103 | 4051 | 1151 | 1151 | 1790 | 1984 | 2154 | 2395 | 2288 |
| $M_z$ | 3512 | 7028 | 6897 | 1864 | 1861 | 3054 | 3293 | 3510 | 4246 | 3767 |
| $M_{z+1}$ | 4981 | 10530 | 10173 | 2609 | 2624 | 4469 | 4698 | 4861 | 8012 | 5508 |
| $M_v$ | 1786 | 3734 | 3693 | 1057 | 1058 | 1630 | 1813 | 1970 | 2179 | 2102 |
| PD | 2.78 | 2.49 | 2.16 | 1.95 | 1.94 | 2.20 | 2.19 | 2.26 | 2.33 | 1.91 |
| Variance ($M_w M_n - M_n^2$) | 9.14E+05 | 4.04E+06 | 4.08E+06 | 3.31E+05 | 3.31E+05 | 7.94E+05 | 9.77E+05 | 1.14E+06 | 1.40E+06 | 1.31E+06 |
| Standard Deviation $S_n$ $(M_w M_n - M_n^2)^{1/2}$ | 956 | 2011 | 2020 | 575 | 575 | 891 | 988 | 1070 | 1185 | 1143 |
| Skewness | 2.68E+09 | 2.30E+10 | 2.29E+10 | 4.74E+08 | 4.73E+08 | 1.97E+09 | 2.52E+09 | 3.07E+09 | 5.03E+09 | 3.92E+09 |
| $_n\alpha_3$ | 3.068 | 2.832 | 2.773 | 2.491 | 2.484 | 2.783 | 2.612 | 2.505 | 3.022 | 2.624 |

Examples BR-1 to BR-4 illustrate preferred procedures for preparing brominated adducts and/or brominated oligomers of this invention on a continuous basis.

EXAMPLE BR-1

Continuous Bromination of a 4-Ring Toluene/Styrene Adduct 1,3,5,7-Tetraphenylheptane (TPH), Distillation Fraction from Example 12

An 80-mL capacity cylindrical glass reaction vessel was used for the bromination. The reactor had an outer insulating vacuum jacket and an inner jacket for circulating glycol coolant. The vessel had two inlet ports on the bottom for delivery of reagent solutions directly under the bottom blade of the dual turbine agitator made of Teflon polymer (operated at 350 rpm). The reactor had a thermowell located next to the bottom turbine blade. An overflow port located just above the top turbine blade allowed the reaction mixture to flow by gravity to a splitter that could direct the flow to the main product quench pot (5-L fully jacketed round bottom flask with paddle stirrer) or to a secondary waste quench pot (2-L Erlenmeyer). Exit gases from the reactor passed overhead through a Friedrich's condenser and into an aqueous caustic scrubber with assistance from a constant nitrogen purge at the top of the condenser. During the bromination, the hood lights were turned off and the reaction vessel was wrapped with aluminum foil to minimize photobromination. Two peristaltic pumps were used to deliver solutions of $AlBr_3$ in bromine and 1,3,5,7-tetraphenylheptane (distillation fraction from Example 12) in bromochloromethane (BCM) to the reactor through the bottom inlet ports using feed lines of Teflon polymer (⅛-inch) and Viton polymer (0.10-inch). The operation was started by charging the reaction vessel with 172.8 g of dry BCM (<10 ppm water) and then cooling the liquid to −6° C. (circulating bath at −10° C.). The $AlBr_3$/bromine feed solution was prepared by dissolving 3.60 g of $AlBr_3$ in 856.7 g of bromine. A 30.0 wt % solution of TPH was prepared by dissolving 311.8 g of TPH in 727.7 g dry bromochloromethane (BCM). The reactants were delivered to the reaction vessel at average feed rates of 1.45 mL/min (4.44 g/min) for the $AlBr_3$/bromine solution and 3.63 mL/min (5.56 g/min) for the TPH/BCM solution. The reaction temperature quickly rose to +2° C. and then stabilized at 0° C. for the duration of the feeds. For the first 50 min, the overflow stream from the reactor was directed to the waste quench pot (containing 768 g of 5 wt % aqueous $Na_2SO_3$). At this point, it was assumed a steady state condition (over 3 residence times) had been reached, so the overflow stream was diverted to the main quench pot (containing 784 g of 5 wt % aqueous $Na_2SO_3$) to collect the product mixture over a period of 136 min at 5-10° C. with an average residence time in the reactor of 15.7 min. The lower cloudy organic phase (1013.2 g) in the main quench pot was separated from the aqueous phase, and combined in a 2-L separatory funnel with a BCM rinse (183.0 g) of the quench vessel. The organic phase was washed with water, dilute aqueous NaOH, and finally water to remove residual acid and salts. Solvent was removed from the cloudy solution using a rotary evaporator (96° C./10 ton) to obtain 517.2 g of a clear viscous light amber liquid that solidified to a glass upon cooling to ambient temperature. Analytical results for the product are summarized in Table 5.

EXAMPLE BR-2

Continuous Bromination of Oligomer of Example 14

Example BR-1 was repeated using the oligomer made in Example 14. The operation was started by charging the reaction vessel with 167.5 g of dry BCM (<10 ppm water) and then cooling the liquid to −7° C. (circulating bath at −10° C.). The $AlBr_3$/bromine feed solution was prepared by dissolving 15.20 g of $AlBr_3$ in 3208.0 g of bromine. A 30.0 wt % solution of Ex. 14 oligomer was prepared by dissolving 999.6 g of the oligomer in 2332.6 g dry BCM. The reactants were delivered to the reaction vessel at average feed rates of 3.75 mL/min (11.6 g/min) for the $AlBr_3$/bromine solution and 7.18 mL/min (11.1 g/min) for the polymer/BCM solution. For the first 115 min, the overflow stream from the reactor was directed to the waste quench pot (containing 800 g of 5 wt % aqueous $Na_2SO_3$). The overflow stream was diverted at that point to the main quench pot (containing 774 g of 5 wt % aqueous $Na_2SO_3$) to collect the steady state product over a period of 74 min with the reaction temperature at +8° C. The product fraction was collected in the quench pot at 5-10° C. with an average residence time in the reactor of 7.3 min. After redirecting the overflow from the reactor to the waste quench pot, the lower white organic phase (985.4 g) in the main quench pot was separated from the aqueous phase, and combined in a 2-L separatory funnel with a BCM rinse (413.2 g) of the aqueous phase remaining in the quench vessel. Three aqueous washes (700-800 g each) of the organic phase were used to remove residual acid and salts. The washed white organic phase (1346.7 g) was pumped into 3.5-L of vigorously stirred hot water to obtain a slurry of white solid in water. The slurry was suction filtered, and the solid was rinsed on the filter with water (3×1 L). The wet cake (800.5 g) was dried in a nitrogen purged oven at 100° C. to a constant weight of 462.0 g. Analytical results for the white product are summarized in Table 5.

EXAMPLE BR-3

Continuous Bromination of Oligomer of Example 14

The bromination of Example BR-2 was continued after removing the lower organic phase from the main quench pot and rinsing the aqueous phase in the quench pot with BCM as described in Example BR-2. The bromine feed rate was increased to 4.43 mL/min (13.7 g/min) while holding the oligomer feed rate constant at 7.18 mL/min (11.1 g/min). After allowing 20 min to reach steady state conditions, the overflow from the reactor was redirected to the main quench pot (containing dilute aqueous $Na_2SO_3$) and crude product solution was collected for 68 minutes at a reaction temperature of 9° C. and an average residence time of 6.9 minutes. After redirecting the overflow from the reactor to the waste quench pot, the white organic phase (1233.0 g) in the main quench pot was separated from the aqueous phase, and combined in a 2-L separatory funnel with a BCM rinse (485.9 g) of the quench vessel. Three aqueous washes (700-800 g each) were used to remove residual acid and salts. The washed organic phase (1629.1 g) was pumped into 3.5-L of vigorously stirred hot water to obtain a slurry of solid in water. The slurry was suction filtered, and the white solid was rinsed on the filter with water (3×1 L). The wet cake (1330.1 g) was dried in a nitrogen-purged oven at 100° C. to a constant weight of 648.0 g. Analytical results for the white product are summarized in Table 5.

EXAMPLE BR-4

Continuous Bromination of Oligomer of Example 20

Example BR-1 was repeated using the oligomer made in Example 20. The 80-mL reaction vessel was charged with 162.3 g of dry BCM (<10 ppm water) and then cooled to 0° C. (circulating bath at −4° C.). The $AlBr_3$/bromine feed solution was prepared by dissolving 6.74 g of $AlBr_3$ in 1669.9 g of bromine. A 30.0 wt % solution of Example 20 polymer was prepared by dissolving 650.9 g of the oligomer in 1518.6 g dry BCM. The reactants were delivered to the reaction vessel at average feed rates of 2.77 mL/min (8.60 mL/min) for the $AlBr_3$/bromine solution and 6.78 mL/min (10.5 g/min) for the polymer/BCM solution. For the first 35 minutes, the overflow stream from the reactor was directed to the waste quench pot (containing 755 g of 5 wt % aqueous $Na_2SO_3$). At this point, the overflow stream was diverted to the main quench pot (containing 587 g of 5 wt % aqueous $Na_2SO_3$) to collect the steady state product over a period of 159 minutes with the reaction temperature at 9° C. to 11° C. The steady state product fraction was collected in the quench pot at 5-10° C. with an average residence time in the reactor of 8.5 minutes. The lower organic phase (3451.4 g) in the main quench pot was separated from the aqueous phase, and combined with a BCM rinse (434.3 g) of the quench vessel. Three aqueous washes (water, dilute aqueous NaOH, and water) were used to remove residual acid and salts. The washed organic phase (3923.8 g) was pumped into vigorously stirred hot (94-97° C.) water to obtain a mixture of agglomerated lumps and finely divided white solid in water. The mixture was suction filtered, and the solid was rinsed on the filter with water. The lumpy wet cake (2661 g) was reduced to a powder and dried in a nitrogen purged oven at 100° C. to reach a constant weight of 1158.8 g. Analytical results for the product are summarized in Table 5.

TABLE 5

| Example | BR-1 | BR-2 | BR-3 | BR-4 |
|---|---|---|---|---|
| Wt % Br (XRF) | 58.3 | 66.0 | 69.7 | 58.7 |
| Thermal HBr, ppm (320° C./15 min/$N_2$) | 936 | 1049 | 776 | 677 |
| Thermal Hunter Lab Solution Color (320° C./15 min/$N_2$) | | | | |
| L | 91.16 | 72.55 | 79.25 | 70.52 |
| a | −9.23 | 11.85 | 5.30 | 11.25 |
| b | 34.53 | 35.37 | 37.12 | 35.19 |
| ΔE | 36.51 | 46.25 | 42.99 | 47.03 |
| Hunter Lab Solution Color (10 wt % in chlorobenzene) | | | | |
| L | 97.99 | 99.20 | 99.69 | 96.91 |
| a | 0.95 | −0.43 | −0.83 | 0.25 |
| b | 5.52 | 6.54 | 4.22 | 11.36 |
| ΔE | 6.08 | 6.61 | 4.31 | 11.79 |
| DSC, $T_g$ (° C.) | 78.8 | 97.6 | 112.2 | 98.3 |

Example BR-5 illustrates a preferred procedure for preparing perbrominated adducts in a batch process.

EXAMPLE BR-5

Preparation of Decabromo-1,3-Diphenylpropane by Batch Bromination

A 1-L round bottom flask equipped with a reflux condenser, a thermometer with a temperature controller, a mechanical stirrer, an addition funnel and a cold caustic scrubber was charged with 2355 grams (approx. 700 mL) of bromine and 12.5 grams of anhydrous $AlCl_3$ was added as a catalyst. The slurry was stirred and heated to 60° C. 1,3-Diphenylpropane distilled and recovered in Example 22 was then added subsurface to the stirred $Br_2/AlCl_3$ slurry at 60° C. over a period of three hours. The reaction mixture was stirred at 50° C. for another hour, cooled slightly and then 100 mL of water was added slowly to decompose the catalyst. The reaction vessel was equipped with a Barret trap, and heated again to distill excess bromine until a vapor temperature of 98° C. was reached. More water was added to the reaction mixture during the distillation to replace the bromine volume removed in order to have a stirrable reaction mass. The reaction slurry was cooled and then sodium hydroxide was added until most of the trace bromine color was gone. The solid was isolated by filtration and then dried in an oven at 200° C. for one hour. The solid was cooled then washed with toluene to remove colored impurities, allowed to dry in air at room temperature overnight, and finally dried in an oven at 120° C. for three hours. The white product thus formed (476.65 grams) was analyzed to have a bromine content of 80.79 wt. % (theory=81%). TGA showed a 1% loss at 317.9° C., 5% loss at 348.5° C. and 10% loss at 363.2° C. A DSC melting point of 309-310.6° C. was recorded for this material. It contained only 12 ppm of free bromine and 104 ppm of ionic bromide, as analyzed by ion chromatography.

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

It will also be understood that the terms "substantial" and "substantially" denote that chemical processes ordinarily do not involve absolutes. Thus instead of describing a variable as an absolute, it is far more realistic to describe the variable as being in the substantial vicinity of the expressed variable. For example when describing a stoichiometric quantity it is far more realistic to refer to the quantity as being substantially a stoichiometric quantity since one skilled in the art fully realizes that slight deviations from the absolute stoichiometry would produce no appreciable difference in results. Thus in any and all respects, this document should be read with the application of common sense.

Each and every patent, patent application and printed publication referred to above is incorporated herein by reference in toto to the fullest extent permitted as a matter of law.

This invention is susceptible to considerable variation in its practice. Therefore, the foregoing description is not intended to limit, and should not be construed as limiting, the invention to the particular exemplifications presented hereinabove.

That which is claimed is:

1. A composition which comprises a mixture comprising at least about 95 wt % of two or more adducts and one or more oligomers, which individual adducts and oligomer(s) of these mixtures can be represented by the formula:

Ar—CH$_2$[—CH$_2$CR(Ar')]$_n$—CH$_2$CHR—Ar' wherein Ar and each Ar' are phenyl groups, each R is a hydrogen atom, n is a whole number in the range of 0 to 24 and wherein said composition has a polydispersity in the range of 1.1 to about 3.0, a standard deviation in the range of 60 to 2100 Daltons, and an asymmetry in the range of 1.763 to 4.13.

2. A composition as in claim 1 wherein said composition is a mixture of adducts in which the values of n in the individual adduct formulas are consecutive numbers.

3. A composition as in claim 1 wherein n is in the range of about 1 to about 20.

4. A composition as in claim 1 wherein n is in the range of about 1 to about 9.

5. A composition as in claim 1 wherein said composition further comprises low molecular weight polymers.

6. A composition as in claim 1 wherein said composition has a polydispersity in the range of about 1.32 to 1.64, a standard deviation in the range of about 69 to about 471 Daltons, and an asymmetry in the range of about 1.763 to about 4.13.

7. A composition as in claim 5 wherein said composition has a polydispersity in the range of about 1.2 to about 3.0, a standard deviation of about 160 to about 2100 Daltons, and an asymmetry of about 1.763 to about 4.13.

8. A composition as in claim 1 wherein at least 35 weight percent of said mixture is composed of components in which n is in the range of 1 to about 5.

9. A composition as in claim 1 wherein at least 20 weight percent of said mixture is composed of components in which n is in the range of 1 to about 3.

10. A composition as in claim 1 wherein at least about 0.005 wt % to about 5 wt % of the composition is comprised of moieties represented by the formulae:

CH$_3$C$_6$H$_4$—CH$_2$CH$_2$Ar'

CH$_3$C$_6$H$_4$(CH$_2$CH$_2$Ar'—)$_n$CH$_2$CH$_2$Ar'

Ar'CH$_2$CH$_2$(Ar'CH$_2$CH$_2$)$_m$CH$_2$C$_6$H$_4$(CH$_2$CH$_2$Ar'—)$_n$CH$_2$CH$_2$Ar' wherein Ar' is a phenyl group; n is a whole number; m is a whole or fractional number; and the sum of m and n is equal to or less than about 24.

11. A composition as in claim 1 wherein said mixture comprises
- 1,3-diphenylpropane, and at least about 0.005 wt % to about 5 wt % of said mixture comprises 2-(2-phenylethyl)toluene, 3-(2-phenylethyl)toluene, and 4-(2-phenylethyl)-toluene;
- 1,3,5-triphenylpentane, and at least about 0.005 wt % to about 5 wt % of said mixture comprises 1-tolyl-2,4-diphenylbutane;
- 1,3,5,7-tetraphenylheptane, and at least about 0.005 wt % to about 5 wt % of said mixture comprises 1-tolyl-2,4,6-triphenylhexane; or
- 1,3,5,7,9-pentaphenylnonane, and at least about 0.005 wt % to about 5 wt % of said mixture comprises 1-tolyl-2,4,6,8-tetraphenyloctane.

\* \* \* \* \*